United States Patent
Hirakawa et al.

[11] Patent Number: 5,860,749
[45] Date of Patent: Jan. 19, 1999

[54] ROLLING BEARING FOR SUPPORTING ROTATING SPINDLES

[75] Inventors: Kiyoshi Hirakawa; Akihiro Kiuchi, both of Kanagawa, Japan

[73] Assignee: NSK Ltd., Tokyo, Japan

[21] Appl. No.: 543,892

[22] Filed: Oct. 17, 1995

[30] Foreign Application Priority Data

Oct. 17, 1994 [JP] Japan .................................... 6-250897
May 30, 1995 [JP] Japan .................................... 7-132100
Oct. 17, 1995 [JP] Japan .................................... 7-268284

[51] Int. Cl.⁶ .................................................. F16C 19/08
[52] U.S. Cl. ........................ 384/492; 384/565; 384/569; 384/625; 384/912
[58] Field of Search .................. 384/492, 625, 384/456, 565, 569, 912

[56] References Cited

U.S. PATENT DOCUMENTS

| | | | |
|---|---|---|---|
| 5,084,116 | 1/1992 | Mitamura | 384/492 |
| 5,085,733 | 2/1992 | Mitamura | 384/492 |
| 5,352,303 | 10/1994 | Murakami et al. | 384/625 |

FOREIGN PATENT DOCUMENTS

| | | | |
|---|---|---|---|
| A20294813 | 12/1988 | European Pat. Off. | F16C 33/62 |
| 5195069 | 8/1993 | Japan | C21D 9/40 |
| 2275509 | 8/1994 | United Kingdom | F16C 33/58 |
| 2281106 | 2/1995 | United Kingdom | F16C 33/58 |

OTHER PUBLICATIONS

"JIS Handbook 1990 Ferrous Materials and Metallurgy", pp. 15, 17, 1963, 2317, published by the Japanese Standards Association, 1990.

*Primary Examiner*—Lenard A. Footland
*Attorney, Agent, or Firm*—Sughrue, Mion, Zinn, Macpeak & Seas, PLLC

[57] ABSTRACT

In a rolling bearing comprising at least one member of an inner race and a shaft, the member having an inner raceway on an outer circumference, an outer race having an outer raceway on an inner circumference, and a plurality of rolling elements interposed rollingly between the inner raceway and the outer raceway, the member having raceways or rolling elements are formed of a steel containing 5–18 wt% of Cr, 0.5–1.2 wt% of C and the balance being Fe. The steel is tempered at a temperature for secondary hardening or subjected to shot peening after low-temperature tempering, so that its hardness is increased to $H_2C$ 57 or more. At the same time, the amount of retained austenite in the steel is reduced to 6 vol% or less. As a result, the impression resistance of the raceways is sufficiently improved to insure that there is no deterioration in acoustic characteristics due to indentation. In addition, the fatigue life and wear resistance of the bearing are improved.

12 Claims, 12 Drawing Sheets

ROLLING BEARING FOR SUPPORTING ROTATING SPINDLES

BACKGROUND OF THE INVENTION

The present invention relates to rolling bearings that are to be assembled into hard disk drives (HDD), video tape recorders (VTR), digital audio tape recorders (DAT) or the like, in particular, to support rotating spindles at high speed thereinto or to support swing arms for the HDD or the like.

FIG. 1 shows a spindle motor that is to be assembled into a HDD on a computer for causing a hard disk driving shaft 1 to rotate at high speed. The shaft 1 and a housing 2 have a pair of ball bearings 3 as rolling bearings provided between the outer circumference of the shaft 1 and the inner circumference of the housing 2 in such a way that the shaft 1 is supported to rotate freely inside the housing 2. Each ball bearing 3 includes a steel inner race 5 having an inner raceway 4 on the outer circumference, a steel outer race .7 having an outer raceway 6 on the inner circumference, and a plurality of steel balls 8 as rolling elements provided rollingly between the inner raceway 4 and the outer raceway 6. All balls 8 are provided with a preload to insure that they may not be fluctuated during the rotation of the shaft 1.

FIGS. 2 and 3 show the structures of other spindle motors for use in HDDS. The structure shown in FIG. 2 has a hub which is integrated with an outer race 7a having a plurality of outer raceways 6 on the inner circumference, and inner raceways 4 which are formed on the outer circumference of a shaft 1 and that of an inner race 5 fitted around the shaft 1. The structure shown in FIG. 3 has a plurality of inner raceways 4 which are formed on the outer circumference of a shaft 1, as well as a plurality of outer raceways 6 formed on the inner circumference of an outer race 7b.

FIG. 20 shows the structure of the HDD into which the a swing arm bearing 30 is assembled with a spindle motor bearing 20 of a type shown in FIGS. 1–3 on the left side of FIG. 20. A magnetic disk 22 is rotated by the spindle motor 21. A pair of reading heads 23 are positioned on the magnetic disk 22 for reading recorded data in the magnetic disk 22. A swing arm 24 is provided for positioning the reading heads 23 to an accessing point within an available area on the magnetic disk 22. The swing arm 24 includes arm rods 28 coupling the reading heads 23 at ends thereof, and a swing arm shaft 27 supported by a swing arm bearing 30. The swing arm 24 is rotated by a coil (not shown) while being controlled. Thus the reading heads 23 can moves radially all over the available area on the magnetic disk 22. The swing arm bearing 30 supports the swing arm 24 rotated at lower revolutions than the spindle motor 21 supported by the spindle motor bearing 20.

In these conventional structures, the members provided with the inner raceways 4 and the outer raceways 6 (namely, inner races 5 and outer races 7 in FIG. 1; outer race 7a, shaft 1 and inner race 5 in FIG. 2; or shaft 1 and outer race 7b in FIG. 3) have been formed of a high-carbon chromium bearing steel SUJ2 (JIS G4805) by hardening at 820°–860° C. and subsequently tempering at 160°–200° C. As a result of these heat treatments, the races are rendered to have a Rockwell hardness of $H_R C$ 58–64 and they contain retained austenite (YR) in an amount of 8–14 vol%.

For use in parts which require sufficient corrosion resistance, the races have occasionally been formed of stainless steels such as SUS 440C (JIS G4303) and 13Cr-based martensitic stainless steel, which are first hardened at temperatures around 1050° C., then subjected to a subzero treatment, followed by tempering at about 150°–200° C. The races formed from these stainless steels have a Rockwell hardness of $H_R C$ 57–62 and contain retained austenite ($\gamma_R$) in an amount of 8–12 vol%. In particular, such stainless steels have been used in the swing-arm bearings to support the reading heads in the HDDs, as shown in FIG. 20.

Unexamined Japanese Patent Publication No. Hei. 5195069 teaches a technique of shot-peening the surface of a bearing steel. According to the disclosure, the technique is capable of increasing a hardness of the bearing steel to the Vickers hardness of $H_v$ 850–950 (equal to $H_R C$ 65.5–68 in terms of Rockwell hardness)[1]. Therefore, if races or rolling elements are produced by the disclosed technique, impressions are not easily formed on the surfaces of the races even if the lubricant is contaminated with foreign matter. In addition, the races may not wear rapidly. These contribute to a longer life of the bearing.

The permanent (plastic) deformation that occurs to the raceways (both inner raceways 4 and outer raceways 6) in the ball bearing and the rolling surfaces of balls 8 are conventionally defined in terms of the basic static load rating CO. Accordingly, it has been proposed that a deleterious permanent deformation occurs in the raceways and the rolling surfaces if the maximum contact pressure between the two parts exceeds 4000 MPa.

Among various kinds of rolling bearings, small-sized ball bearings which are used in HDDs and VTRs have high precision such as JIS Class 5 or better in dimensional or rotating precision. The ball bearings which are required to rotate with small torque must satisfy further strict requirements in acoustic and noise performance. With such small-sized ball bearings with high precision, there has been a serious problem in that they experience acoustic deterioration (increase in noise level) due to an extremely small permanent deformation that occurs in raceways or rolling surfaces under much smaller loads (e.g. impact load) than 4000 Mpa, or the value of maximum contact pressure specified by the basic static load rating $C_0$, supra. Similarly, the permanent deformation affects adversely the swing arm bearing 30 as shown in FIG. 20.

Ball bearings 3 (see FIGS. 1–3) used as such small-sized, high-precision ball bearings are commonly designed in such a way that balls 8 assembled between the inner raceway 4 and the outer raceway 6 have a diameter $D_w$ (see FIG. 1) of no more than 3 mm and are spaced on the circumference of a pitch circle having a diameter $D_{PW}$ (also see FIG. 1) of no more than 11 mm. However, with the recent trend toward smaller HDDs and VTRs, the size of ball bearings 3 to be assembled into these equipment is also decreasing. With the ball bearings 3 assembled in such small equipment, they are exposed to more accidents of impact application primarily due to the increased possibility of drop of the portable equipment. Even if the intensity of an applied impact is relatively small, the raceways or rolling surfaces of the bearings undergoes permanent deformation, which can cause various problems of deterioration in the performance of the equipment which incorporates the ball bearings, as exemplified by acoustic deterioration and irregular rotating torques.

The permanent deformation of the raceways or rolling surfaces which leads to deterioration in the performance of the equipment incorporating ball bearings is known to occur if the retained austenite in the steel forming the races or rolling elements has low yield stress. In order to prevent this permanent deformation problem originating from the retained austenite, it has previously been proposed that the amount of retained austenite in the steel forming races of a rolling bearing should be reduced to 6 vol% and less This approach is effective in making the raceways hard to deform permanently under impact load and offers the following advantages.

(1) When the races are to be made from SUJ2, the amount of retained austenite can substantially be reduced to 0% by tempering the steel at about 240° C. and the impact resistance of the races (their ability to withstand impact loads without permanent deformation) can be improved remarkably. If the process described in Unexamined Japanese Patent Publication No. Hei. 5-195069 is employed, the amount of retained austenite is reduced to 10 vol% or less and the hardness is increased to $H_V$ 850–950. Therefore, an impression resistance is improved.

(2) In the case of SUS 440C and 13Cr-based martensite stainless steel, tempering at temperatures exceeding 500° C. is capable of reducing the amount of retained austenite to 6 vol% and below. Therefore, an impact resistance is improved.

(3) Bearing materials of secondary hardening type steel M50 (designation AMS 6490 or 6491; AMS is a standard in SAE) and high-speed tool steel SXH4 (JIS G4403), which are conventionally used to make races, have high surface hardness and exhibit superior impact resistance.

However the races described under (1)–(3) have their own problems. The races of (1) and (3) types are low in Cr content, so that the races cannot achieve satisfactory corrosion resistance depending on the operating conditions. For example, in the case of a ball bearing to be used in HDD, since an adhesive is used to fix the races, the internal surfaces of inner races or the external surfaces of outer races are completely degreased. Accordingly, in order to prevent those internal or external surfaces from rusting after 1s assembling into the bearing, the races must be made of materials which have satisfactory corrosion resistance. However, the races described under (1) and (3) are not suitable for this purpose.

The race described under (2) has satisfactory corrosion resistance but, on the other hand, it is not highly durable. Tempering at temperatures in excess of 500° C. reduces the surface hardness to $H_RC$ 56 and below. As a result, the rolling fatigue life and wear resistance of the races decrease to shorten the life of the ball bearing incorporating those races. In addition, the raceways are prone to be damaged on the assembly line of bearings to cause inconveniences such as increasing poor acoustic performance that may occur during the process of manufacture.

SUMMARY OF THE INVENTION

The rolling bearing of the present invention has been accomplished under conventional circumstances. An object of the invention is to insure satisfactory corrosion resistance while rendering at least one of the races and the rolling elements hard to experience deleterious permanent deformation by improving their resistance to loads and impacts (impression resistance).

The object of the present invention is attained by a rolling bearing including at least one member of an inner race and a shaft, the member having an inner raceway on an outer circumference, an outer race having an outer raceway on an inner circumference, and a plurality of rolling elements interposed rollingly between the inner raceway and the outer raceway, in which at least one component of the member the outer race and the rolling elements are formed of a steel containing 5–18 wt% of Cr, 0.5–1.2 wt% of C and the balance being Fe, the steel being so hardened that the component has a surface hardness of $H_RC$ 57 or more and a surface layer including an amount of retained austenite of no more than 6 vol%.

The first aspect to harden the steel having the composition specified above is to select a secondary hardenable steel that contains at least one additional element selected from among 0.8–6 wt% of molybdenum (Mo), 0.3–3 wt% of vanadium (V) and 1–6 wt% of tungsten (w) and tempering it at a temperature at which secondary hardening takes place. The second aspect is to harden and temper the steel which composes at least one of the shaft, the races and the rolling elements and thereafter harden their surfaces by shot peening so as to provide a surface hardness of HRC 57 or more. The third aspect is to harden and temper the steel which composes at least one of the shaft, the races and the rolling elements and thereafter subjecting them to a subzero treatment, followed by tempering and shot peening to provide a surface hardness of HRC 57 or more.

The members to be formed of the alloy (steel) that satisfies the compositional requirements set forth above are preferably all of the inner race (or shaft), the outer race and the rolling elements. However, if certain parts are to be used under more severe conditions than other parts, either one of the inner race (or shaft) and the outer race, as well as the rolling elements can be formed of the alloy or, alternatively, only the rolling elements or either one of the inner race (or shaft) and the outer race can alone be formed of the alloy.

In a more preferred embodiment, the upper limit of the C content which is related to the Cr content is expressed by (1.23−0.035 Cr) wt%, in which Cr represents "5–18" as the Cr content in wt%. Therefore, the upper limit of the C content decreases with the increasing Cr content. For example, if Cr is contained at a maximum (18 wt%), the upper limit of the C content is 1.23−0.035×18=0.6 (wt%). Conversely, if Cr is contained at a minimum (5 wt%), the upper limit of the C content is 1.23−0.035×5 =1.06 (wt%).

The rolling bearing of the present invention which is characterized as described above is less prone to experience deleterious permanent deformation in the raceways or the rolling surfaces of the rolling elements even if it receives impact and other kinds of loads. Stated more specifically, austenite has a lower yield stress than martensite, so the conventional rolling bearings which contain retained austenite in fairly large amounts of 8–14 wt% experience deleterious permanent deformation under small loads. On the other hand, the rolling bearing of the present invention which is composed of the members or rolling elements that are formed of the steel containing no more than 6 vol% of retained austenite is improved in the ability of raceways or rolling surfaces to withstand impacts without forming impressions (their impression resistance and hence yield stress is increased) and becomes less prone to experience deleterious permanent deformation under small loads.

If the races or rolling elements of a rolling bearing are made of a secondary hardenable steel which contains 5–18 wt% of Cr and 0.5–1.2 wt% of C and which further contains one or more elements selected from among 0.8–6 wt% or Mo, 0.3–3 wt% of V and 1–6 wt% of W and if this steel is tempered at a temperature that causes secondary hardening,. the amount of retained austenite is reduced and yet a surface hardness of HRC 57 or more can be insured (this is the first aspect to attain the objective of the present invention). Alternatively, a steel containing 5–18 wt% or 07 and 0.5–1.2 wt% of C is hardened and tempered and thereafter subjected to shot peening (the second aspect) or the hardened steel is subjected to a subzero treatment, followed by tempering and shot peening (the third aspect), so that the amount of retained austenite in the surface layer can be reduced while insuring a surface hardness of $H_RC$ 57 or more. Even if the amount of retained austenite in the surface layer exceeds 6 vol% just after tempering is effected in the second and third aspects, it can be reduced to 6 vol% and less by performing shot peening. Therefore, the rolling bearing of the present invention guarantees satisfactory rolling life and wear resistance for the raceways or the rolling surfaces. Further, if the present invention is applied to the races, the presence of 5 wt% or more Cr contributes satisfactory corrosion resistance and the surfaces of the races do not corrode even in HDD and other applications where the bearing is used with the internal or external surfaces of the races being degreased.

DETAILED DESCRIPTION QF THE INVENTION

Figure 1:
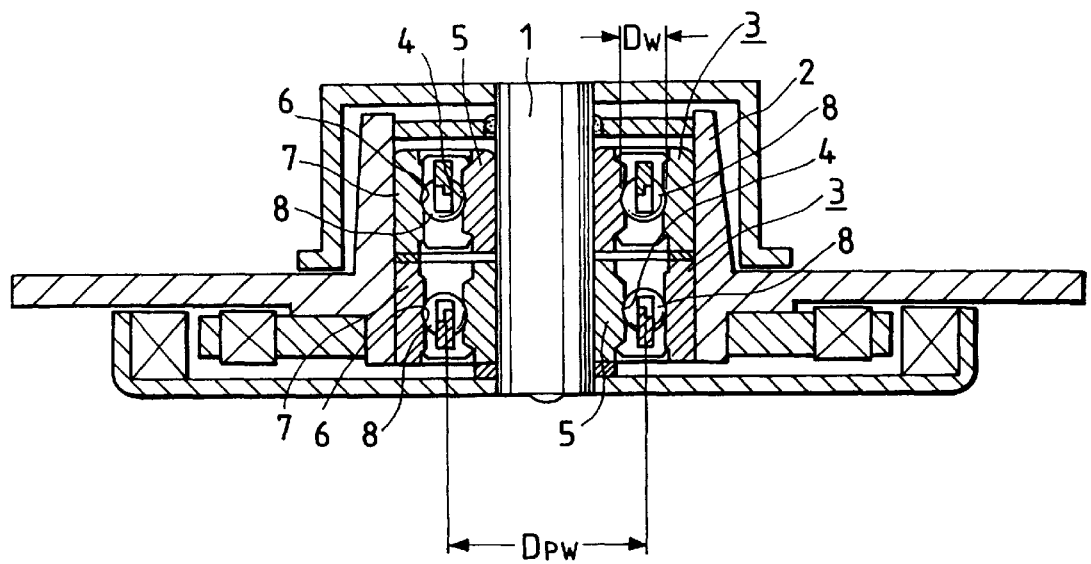
FIG. 1 is a sectional view showing a first example of the spindle motor on a HDD into which the ball bearing of the present invention has been assembled.
Figure 2:
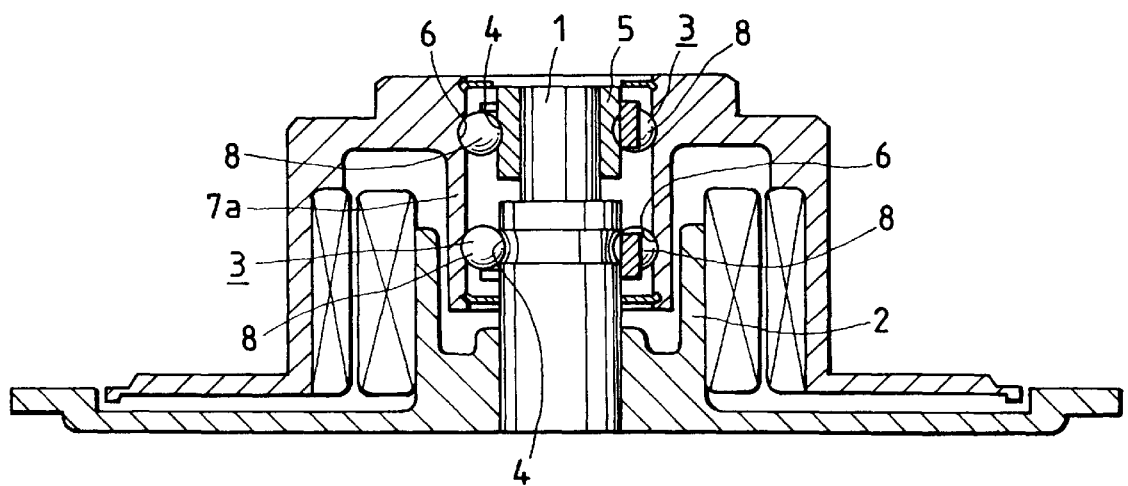
FIG. 2 is a sectional view showing a second example of the spindle motor on a HDD into which the ball bearing of the present invention has been assembled.

There will be described the reasons for the inclusion of the respective elements and the criticality of their contents.

Chromium (Cr) is added in order to insure that the surfaces of races do not corrode (to make them corrosion resistant) even if the bearing is used with those surfaces degreased as in the case of ball bearings for use in HDD. If the Cr content is less than 5 wt%, the intended corrosion resistance is not attained. Hence, Cr should at least be contained in a minimum amount of 5 wt%. In the case of a rolling bearing that is to be used in comparatively severe conditions where high humidity can potentially cause dew condensation on the surfaces of races, the Cr content is preferably increased to 7 wt% and above. However, no further improvement in corrosion resistance is realized even if Cr is contained in amounts exceeding 18 wt%. Chromium is a comparatively expensive metal and should preferably be contained in smaller amounts from the viewpoint of reducing the production cost. With these factors taken into consideration, the Cr content is specified to lie within the range from 5 to 18 wt%.

Carbon (C) is contained in order to insure a surface hardness of $H_RC$ 57 and more for the races or rolling elements after they have been hardened and tempered. If the C content is less than 0.5 wt%, the surface hardness as attained by hardening and tempering is inadequate (less than $H_RC$ 57) and the raceways of rolling surfaces can no longer have the desired rolling life and wear resistance. Therefore, the C content should be at least 0.5 wt%. On the other hand, there can be no further increase in surface hardness even if C is contained in amounts exceeding 1.2 wt%. Therefore, the C content should be 1.2 wt% and less. However, if the C content which is related to the Cr content exceeds (1.23–0.035 Cr) wt%, primary macro carbides are easily formed. Since Cr as well as Mo, W and V are carbide-forming elements, they combine with C to form carbides that are expressed by $M_{23}C_6$, $M_7C_3$ and the like. (M is the carbide-forming element). Unlike $Fe_3C$, such carbides cannot be rendered fine grained by soaking and other methods and their crystal grains tend to remain in their initial size on the races and rolling elements. Thus, the formation of primary macro carbides deteriorates the properties of the raceways or rolling surfaces (leads to greater surface roughness) and higher levels of noise and vibrations occur during the operation of the rolling bearing. The deteriorated surface properties due to the primary carbides could be corrected by finish grinding; however, the primary carbides are so hard that grinding them is cumbersome and adds to the cost of producing the races or rolling elements. Therefore, the upper limit of the C content is preferably limited by the expression set forth above.

In the first aspect of attaining the objective of the present invention, Mo, V and W are contained in order to insure that the steel of which the races and the shaft or the rolling elements are to be formed is of a secondary hardening type. Among these additional elements, Mo must be contained in an amount of at least 0.8 wt% in order to perform secondary hardening; however, the effectiveness of Mo decreases if its content exceeds 6 wt%. Therefore, the Mo content is specified to lie between 0.8 and 6 wt%. For secondary hardening, at least 0.3 wt% of V is necessary but the effectiveness of V decreases if its content exceeds 3 wt%. Therefore, the V content is specified to lie between 0.3 and 3 wt%. Speaking of W, it must be contained in an amount of at least 1 wt% but beyond 6 wt%, its effectiveness decreases. Therefore, the W content is specified to lie between 1 and 6 wt%.

The upper limit of the amount of retained austenite is set to insure that the raceways or rolling surfaces do not readily experience deleterious permanent deformation under impact and other kinds of loads. If austenite which has low yield stress is contained in a large amount, deleterious permanent deformation readily occurs under small impact and other kinds of loads. In order to prevent the occurrence of such permanent deformation, it is necessary that the amount of retained austenite be reduced to a low level. According to the experiments conducted by the present inventors, it was found that when the amount of retained austenite was 6 vol% and less, the impression resistance of the raceways or rolling surfaces improved to realize a rolling bearing that had practically feasible acoustic and vibration characteristics. In any event, the amount of retained austenite is preferably as small as possible.

As already mentioned, the requirements of acoustic and vibration characteristics are particularly rigorous with small-sized ball (or rolling) bearings in which balls (or rolling elements) 8 have a diameter $D_W$ (see FIG. 1) of no more than 3 mm and are spaced on the circumference of a pitch circle having a diameter $D_{PW}$ (also see FIG. 1) of no more than 11 mm. Hence, it is important for such small-sized ball bearings to contain retained austenite in amounts not exceeding 6 vol%. If possible, the amount of retained austenite in the races or the rolling elements (balls) 8 as components of those small-sized ball (rolling) bearings should preferably be 4 vol% or less, more preferably (for the reason to be stated just below) 2 vol% or less.

In addition to the improvement in the impression resistance of raceways or rolling surfaces, the reduction in the amount of retained austenite is also effective in insuring that the surface precision of the raceways or rolling surfaces are prevented from deteriorating with age. If a large amount of retained austenite is contained in the raceways or rolling surfaces, the retained austenite decomposes under the rolling stress which is cyclically applied to the raceways or rolling surfaces as the rolling bearing is continuously used. The decomposition of the retained austenite results in deterioration in the surface precision of the raceways or rolling surfaces. On the other hand, the rolling bearing of the present invention contains a smaller amount of retained austenite than the conventional versions and, hence, the deterioration in surface precision due to the decomposition of the retained austenite and the deterioration in acoustic characteristics due to deteriorated surface precision are both reduced. It is worth particular mention here that by reducing the amount of retained austenite to 2 vol% and less, the deterioration in acoustic characteristics due to the decomposition of retained austenite can be substantially eliminated.

In the present invention, the surface hardness of the races or rolling elements, especially that of the raceways or rolling surfaces, is controlled to be $H_RC$ 57 or more in order to insure the necessary rolling life and wear resistance for the raceways or rolling surfaces. According to the experiments conducted by the present inventors, it was verified that when small-sized ball bearings of the kind described above which were to be used as assembled into HDDs and other small equipment had a surface hardness of $H_RC$ 57 or more, the desired rolling life and wear resistance could be insured to guarantee satisfactory endurance. With respect of surface hardness, the hardened layer is effective if it has at least a depth equivalent to 2% of the diameter of each rolling element (the diameter of balls in the case of a ball bearing) as measured from the surface. Therefore, the term "surface layer" as used herein indicates the region from the surface to a depth equivalent to 2% of the diameter of each rolling element.

EXAMPLES

Described below are the experiments the present inventors conducted with a view to verifying the effectiveness of the present invention. First, the experiments conducted to verify the effectiveness of the present invention in the case of using a secondary hardenable steel will be described. The experiments were conducted on 19 samples that were different in various aspects including the amount of retained austenite in the races (see Tables 1 and 2 below). The amount of retained austenite was adjusted by changing the conditions of the heat treatments to be applied to the races.

TABLE 1

| | Chemical composition (wt %) | | | | | | | |
|---|---|---|---|---|---|---|---|---|
| | C | Si | Mn | P | S | Cr | Mo | V | W |
| Invention | | | | | | | | | |
| $A_1$ | 0.50 | 0.12 | 0.35 | 0.007 | 0.009 | 5.0 | 1.4 | 0.3 | 1.3 |
| $A_2$ | 0.97 | 0.49 | 0.71 | 0.013 | 0.010 | 6.0 | 2.5 | — | — |
| $A_3$ | 0.82 | 0.53 | 0.68 | 0.011 | 0.009 | 8.0 | 2.4 | 0.5 | — |
| $A_4$ | 0.82 | 0.53 | 0.68 | 0.011 | 0.009 | 8.0 | 2.4 | 0.5 | — |
| $A_5$ | 0.88 | 0.80 | 0.38 | 0.013 | 0.010 | 9.0 | 1.5 | — | — |
| $A_6$ | 0.68 | 0.51 | 0.37 | 0.009 | 0.010 | 14.0 | 2.1 | — | 1.0 |
| $A_7$ | 0.96 | 1.10 | 0.40 | 0.015 | 0.009 | 12.0 | 0.8 | 0.8 | — |
| $A_8$ | 0.96 | 0.38 | 0.65 | 0.013 | 0.010 | 7.0 | — | 1.5 | — |
| $A_9$ | 1.13 | 0.68 | 0.54 | 0.015 | 0.010 | 10.0 | — | 1.0 | 1.5 |
| Comparison | | | | | | | | | |
| $B_1$ | 1.05 | 0.42 | 0.35 | 0.018 | 0.011 | 17.2 | 0.45 | — | — |
| $B_2$ | 1.05 | 0.42 | 0.35 | 0.018 | 0.011 | 17.2 | 0.45 | — | — |
| $B_3$ | 0.42 | 0.34 | 0.64 | 0.012 | 0.010 | 4.0 | 1.5 | 0.4 | 1.1 |
| $B_4$ | 0.82 | 0.53 | 0.68 | 0.011 | 0.009 | 8.0 | 2.4 | 0.5 | — |
| $B_5$ | 0.85 | 0.85 | 0.38 | 0.013 | 0.010 | 9.0 | 1.5 | — | — |
| $B_6$ | 0.70 | 0.50 | 0.76 | 0.015 | 0.013 | 12.3 | 0.3 | — | — |
| $B_7$ | 0.70 | 0.50 | 0.76 | 0.015 | 0.013 | 12.3 | 0.3 | — | — |
| $B_8$ | 1.05 | 0.21 | 0.32 | 0.014 | 0.015 | 1.4 | — | — | — |
| $B_9$ | 1.05 | 0.21 | 0.32 | 0.014 | 0.015 | 1.4 | — | — | — |
| $B_{10}$ | 0.70 | 0.50 | 0.76 | 0.015 | 0.013 | 12.3 | 0.3 | — | — |

TABLE 2

| | Heat treatment | | | | | Retained austenite throughout the sample | |
|---|---|---|---|---|---|---|---|
| | Hardening temperature, °C. | Tempering temperature, °C. | Surface hardness, $H_RG$ | Primary carbides | Corrosion resistance | (in its surface layer and core), vol % | Impact resistance |
| Invention | | | | | | | |
| $A_1$ | 1100 | *510 | 58 | absent | ○ | 5 | △ |
| $A_2$ | 1080 | 540** | 62 | " | ○ | 0 | ⊙ |
| $A_3$ | 1080 | *520** | 61.5 | " | ⊙ | 6 | △ |
| $A_4$ | 1080 | *540** | 61 | " | ⊙ | 0 | ⊙ |
| $A_5$ | 1080 | 520 | 60 | " | ⊙ | 4 | ○ |
| $A_6$ | 1100 | *520** | 59.5 | " | ⊙ | 2 | ⊙ |
| $A_7$ | 1100 | 540** | 58 | present | ⊙ | 0 | ⊙ |
| $A_8$ | 1100 | 540 | 60 | absent | ⊙ | 0 | ⊙ |
| $A_9$ | 1100 | 540 | 60 | present | ⊙ | 0 | ⊙ |
| Comparison | | | | | | | |
| $B_1$ | 1050 | *500 | 58 | present | ⊙ | 9 | x |
| $B_2$ | 1050 | *540 | 54 | " | ⊙ | 0 | ⊙ |
| $B_3$ | 1100 | *520 | 56 | absent | △ | 2 | ⊙ |
| $B_4$ | 1080 | *200 | 60.5 | " | ⊙ | 14 | x |
| $B_5$ | 1080 | 500 | 60.5 | " | ⊙ | 13 | x |
| $B_6$ | 1050 | *500 | 57 | " | ⊙ | 8 | x |
| $B_7$ | 1050 | *520 | 55 | " | ⊙ | 3 | ○ |
| $B_8$ | 850 | 180 | 62 | " | x | 10 | x |
| $B_9$ | 850 | 240 | 59 | " | x | 0 | ⊙ |
| $B_{10}$ | 1050 | *530 | 52.5 | " | ⊙ | 0 | ⊙ |

Table 1 shows the compositions of the alloys that composed the 19 samples under test. The portions other than the elements listed in Table 1 were occupied by iron (Fe) and very small amounts of incidental impurities to give 100% in total. Table 2 lists the heat treatments applied to the 19 samples, the resulting hardness values (surface hardness values expressed in Rockwell hardness), the presence or absence of primary carbides, the rating of corrosion resistance, the amount of retained austenite in both the surface layer and the core (throughout each sample), and the rating of impact resistance. The numerals in the column of "tempering temperature" that are preceded by a single asterisk indicate that after hardening, a subzero treatment was conducted prior to tempering. The numerals in the same column that are followed by two asterisks indicate that two tempering treatments were conducted, and the numerals followed by no asterisks indicate that a single tempering treatment was conducted.

Of the 19 samples shown in Tables 1 and 2, $A_1$–$A_9$ were within the scope of the present invention and $B_1$–$B_{10}$ were comparisons in which at least one condition was outside the scope of the present invention. Symbols $A_1$–$A_9$ $_{and\ B_1}$–$B_{10}$ appearing in Table 1 correspond to symbols $A_1$–$A_9$ $_{and\ B_1}$–$B_{10}$, respectively, which appear in Table 2 (the same symbol represents the same sample).

Figure 4:
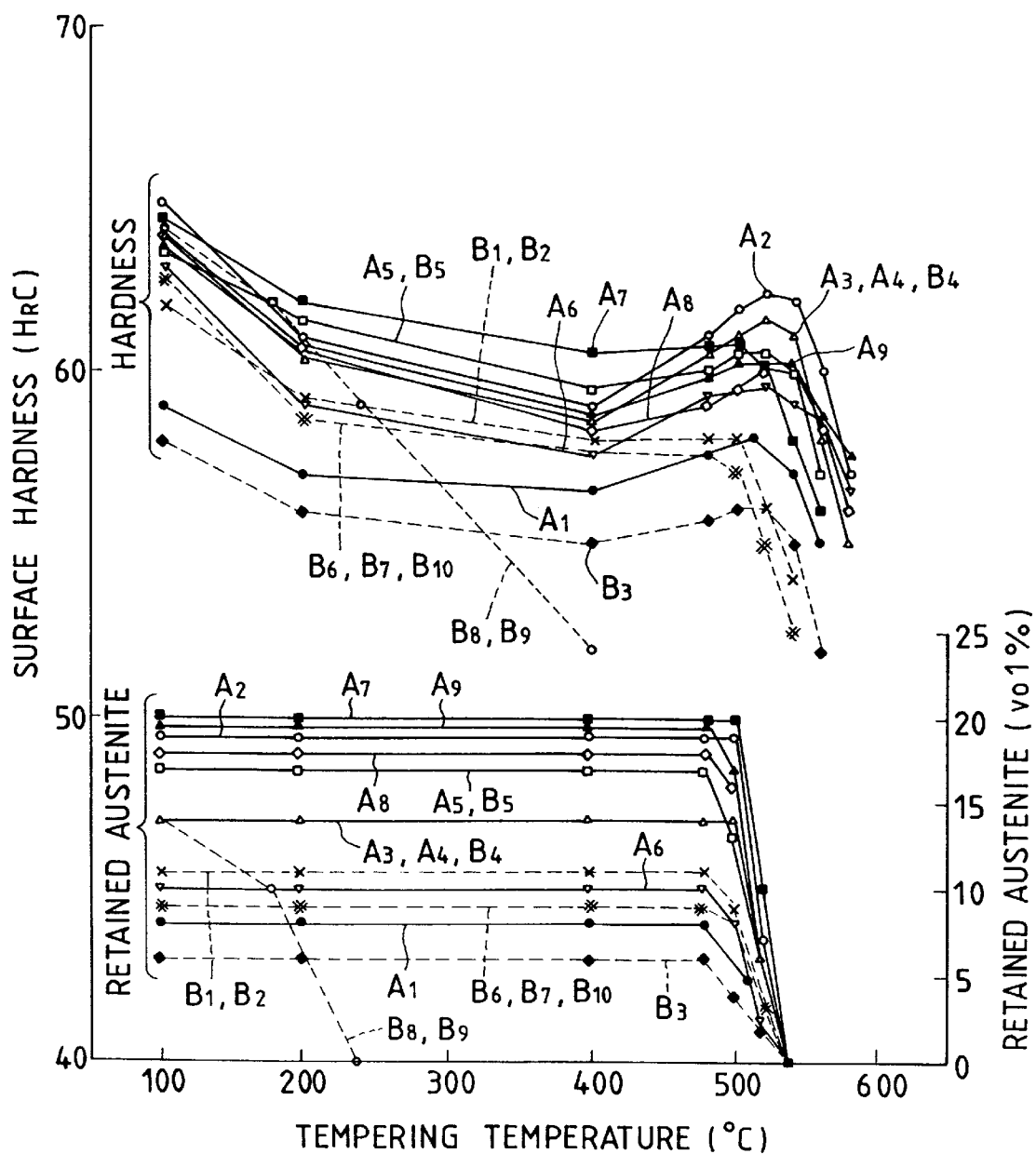
FIG. 4 is a graph showing an impact of the tempering temperature on surface hardness and the amount of retained austenite.

In the first aspect to attain the objective of the present invention, the desired levels of surface hardness and retained austenite are attained by controlling the tempering temperature. FIG. 4 shows the tempering temperature as it relates to surface hardness and the amount of retained austenite. FIG. 4 was constructed on the basis of data that were obtained by determining the surface hardness and the amount of retained austenite for alloys having the compositions shown in Table 1 that were tempered at varying temperatures. Symbols $A_1$–$A_9$ and $B_1$–$B_{10}$ appearing in FIG. 4 correspond to the respective symbols appearing in Table 1. The alloys were hardened at the temperatures listed in Table 2.

As is evident from FIG. 4, when the alloys having the compositions $A_1$–$A_9$ to which the present invention was applicable and the alloys having the compositions $B_4$ and $B_5$ were tempered at high temperatures exceeding 500° C. with a view to reducing the amount of retained austenite, secondary hardening occurred simultaneously with the tempering, thereby achieving an improvement in surface hardness. As a result, surface hardness values of at least HRC 57 were insured and yet the amount of retained austenite could be reduced to 6 vol% and less.

Thus, the amount of retained austenite was not satisfactorily low in any of the alloys when they were tempered at about 500° C.; however, when the tempering temperature exceeded 500° C., the amount of retained austenite decreased sharply and it was substantially zero percent when the tempering temperature was about 540° C., It is therefore concluded that the tempering temperature must exceed 500° C. in order to achieve a significant decrease in the amount of retained austenite. However, with the alloys that did not experience secondary hardening or those which experienced only a small degree of secondary hardening, the surface hardness decreased when tempering temperatures in excess of 500° C. were adopted and it was no longer possible to insure values of HRC 57 or more. The samples with symbols $B_4$ and $B_5$ were designated as comparisons since the amount of retained austenite in these samples was not adequately small on account of the tempering temperature employed (200° C for $B_4$ and 500° C. for $B_5$).

Figure 5:
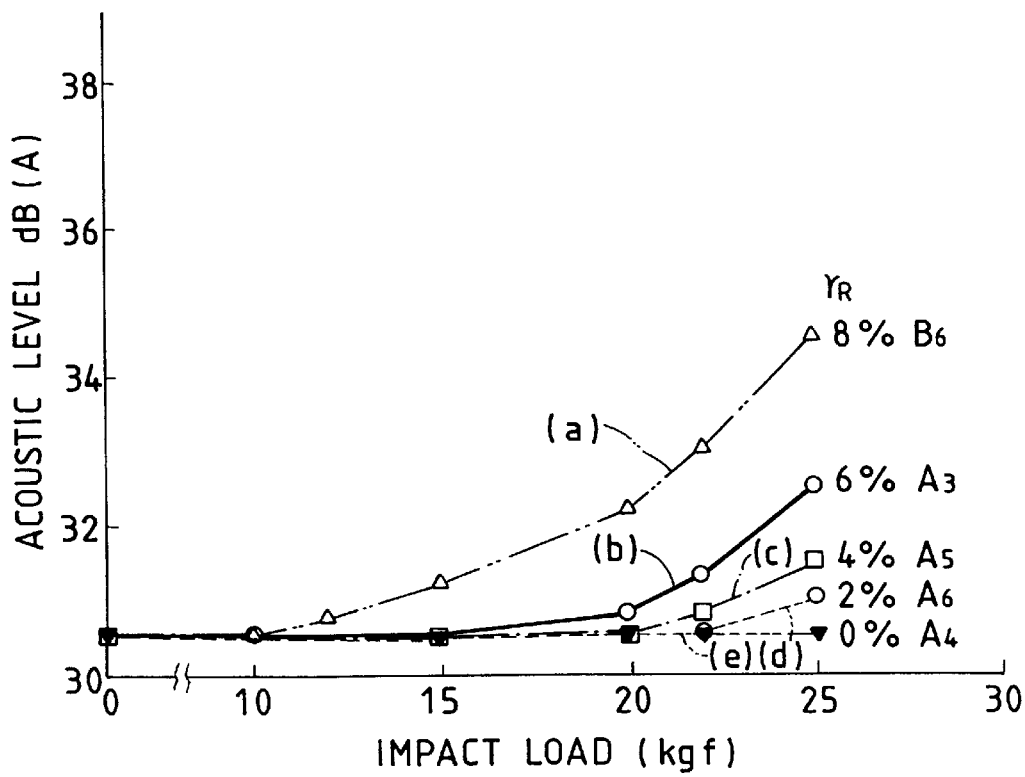
FIG. 5 is a graph showing an impact of retained austenite on the degree of deterioration in acoustic level under impact loads, as determined in the first of the experiments conducted to verify the effectiveness of the present invention for the case of using a secondary hardenable is steel.

FIG. 5 shows the result of an experiment conducted to investigate the impact of the amount of retained austenite on acoustic level. The experimental protocol was as follows: ball bearings using races with varying amounts of retained austenite were assembled into a spindle motor for HDD application (see FIG. 1) and, after impact loads working in a radial direction were applied to each ball bearing, the acoustic level that accompanied the operation of the spindle motor was measured. The inner races in each ball bearing were made of the same material as the outer races. The vertical axis of the graph in FIG. 5 represents the acoustic level that occurred after the application of impact loads and the horizontal axis represents the magnitude of the applied impact loads. One-long-and-two-short dashed line (a) in FIG. 5 refers to the sample containing 8 volt of retained austenite which is identified as $B_6$ in Tables 1 and 2; solid line (b) refers to sample $A_3$ containing 6 vol% of retained austenite; one-long-and-one-short dashed line (c) refers to sample A5 containing 4 volt of retained austenite; dashed line (d) refers to sample $A_6$ containing 2 volt of retained austenite; and another dashed line (e) refers to sample A containing 0% of retained austenite.

As is evident from FIG. 5, when the amount of retained austenite was about 6 volt, the increase in acoustic level was small even under application of great impact loads. When the amount of retained austenite was 4 vol% and less, not only was small the increase that occurred in acoustic level but also the magnitude of impact loads at which the acoustic level started to increase was reasonably great. These data show that the impact resistance of raceways could be improved by reducing the amount of retained austenite to sufficiently low levels. When the amount of retained austenite was further reduced until it became zero percent, the increase in acoustic level was negligible under application of impact loads. The impact resistance of the 19 samples under test is rated in Table 2 by the following criteria: x, poor; $\Delta$, practically feasible; o, good; ⊚, very good.

Figure 6:
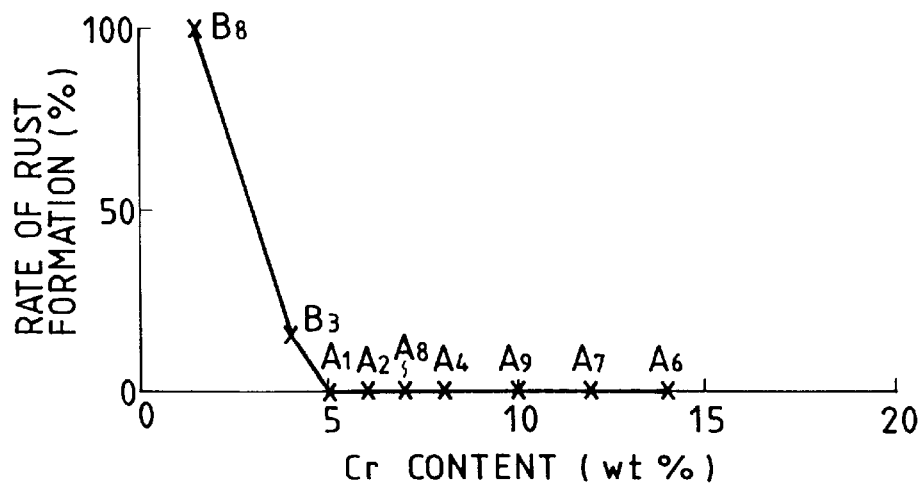
FIG. 6 is a graph showing an impact of Cr content on the corrosion resistance as determined by a temperature-humidity combination test in the second experiment.
Figure 7:
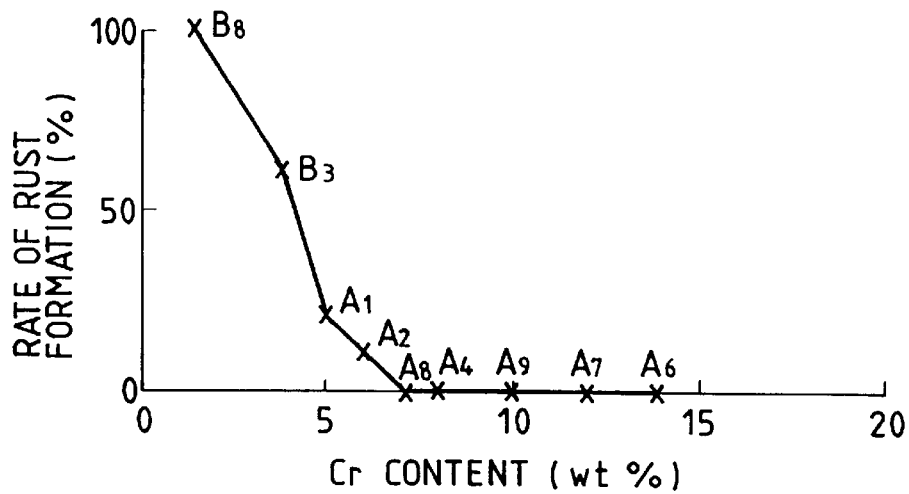
FIG. 7 is a graph showing an impact of Cr content on the corrosion resistance as determined by a wet box test in the second experiment.

FIGS. 6 and 7 show the results of an experiment conducted to evaluate the impact of Cr content on corrosion resistance. Nine alloys having different Cr contents were selected from among the alloys listed in Table 1 and used in the experiment. The selected alloys were $B_8$, $B_3$, $A_1$, $A_2$, $A_8$, $A_4$, $A_9$, $A_7$ and $A_6$ in the increasing order of Cr content. Ten specimens were prepared for each of the 9 alloys and a total of 90 specimens were subjected to corrosion tests after the heat treatments shown in Table 2, finish polishing and surface decreasing. Each specimen was a disk having a diameter of 13 mm and a thickness of 5 mm.

The corrosion tests were of the following two types:

(1) Temperature-humidity combination (cycle) test as the environmental test (electric and electronic) specified under JIS C0028

After 10 temperature-humidity cycles according to this test, the surfaces of the respective specimens were examined visually and the percentage of surface rusting was determined. The result is plotted on the vertical axis of the graph in FIG. 6.

(2) Wet box test specified under JIS K2246

After this test was performed for 1000 h, the surfaces of the respective specimens were examined visually and the percentage of surface rusting was determined. The result is plotted on the vertical axis of the graph in FIG. 7.

The data in FIGS. 6 and 7 show the following. Under environmental conditions as employed in the temperature-humidity combination test, corrosion was prone to occur when the Cr content became less than 5 wt%. Under severe conditions as employed in the wet box test, corrosion was prone to occur when the cr content became less than 7 wt%. Thus, as is evident from the results of the experiment, under normal conditions, the surface rusting of races could be prevented by increasing the Cr content to 5 wt% or more and that even under severe conditions, the same effect could be achieved by increasing the Cr content to 7 wt% or more. The results of the corrosion tests are rated in Table 2 by four criteria: x, poor; a, fair; o, good; ⊚, very good.

Figure 8:
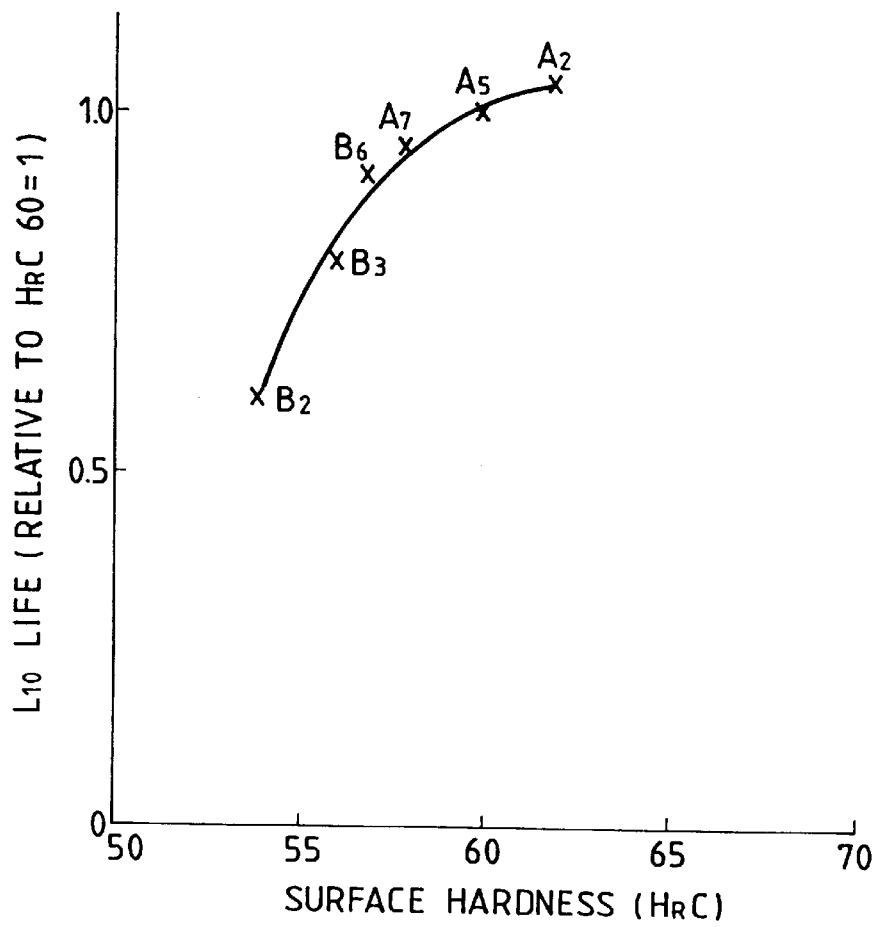
FIG. 8 is a graph showing an effect of surface hardness on rolling fatigue life as determined in the third experiment.

FIG. 8 shows the result of an experiment conducted to evaluate the impact of surface hardness on rolling fatigue life. The experiment was conducted with a thrust life tester of the type described on chapter 10, page 21 of "Handbook of Specialty Steels (Tokushuko Binran)", edited by the Electrosteelmaking Research Institute and published by Rikogakusha on May 25, 1969. Six alloys having different surface hardness values were selected from among the alloys listed in Tables 1 to 2 and used in the experiment. The selected alloys were $B_2$, $B_3$, $B_6$, $A_7$, $A_5$ and $A_2$ in the increasing order of surface hardness. A specimen (thrust race) was constructed for each of the 6 alloys and assembled into thrust ball bearings after the heat treatments shown in Table 2. The bearings were set on the life tester and given a contact pressure of 4900 MPa to measure the rolling life of each of the 6 specimens.

The result of this rolling fatigue life test is shown in FIG. 8. The vertical axis of the graph in FIG. 8 plots the relative life with respect to the reference specimen having a surface hardness of $H_RC$ 60 (plotting a ratio of the life of each specimen when serving the life of the reference specimen as unity). As is evident from FIG. 8, the rolling fatigue life is largely dependent on surface hardness. Accordingly, as the surface hardness increases beyond HRC 55 to approach 57, the rolling fatigue life is extended significantly.

Figure 9:
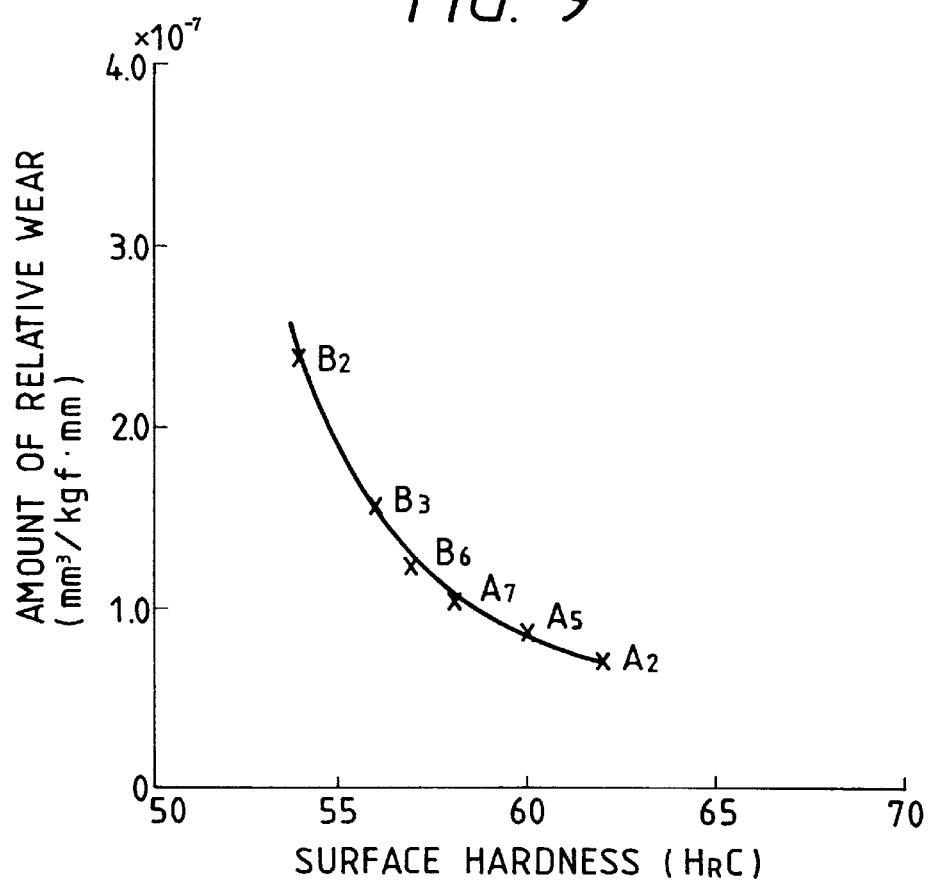
FIG. 9 is a graph showing an effect of surface hardness on wear resistance as determined in the fourth experiment.
Figure 10:
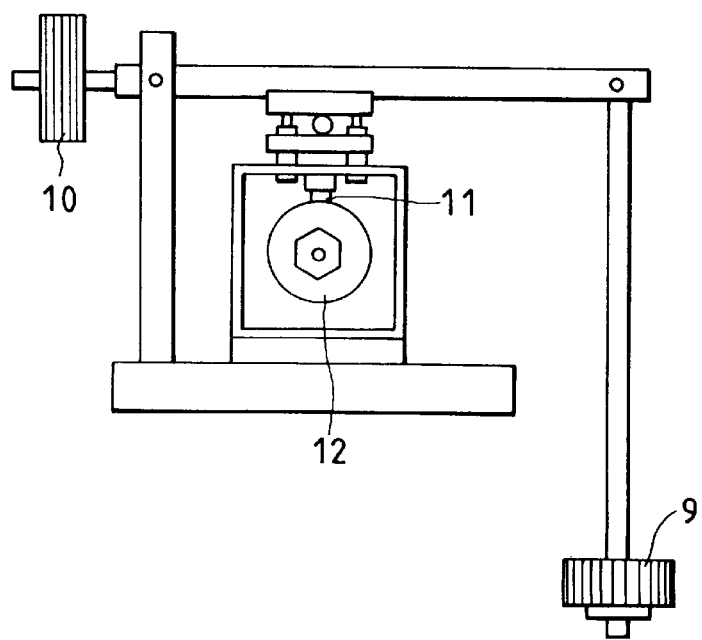
FIG. 10 is a front view of the tester used in wear resistance measurements.

FIG. 9 shows the result of an experiment conducted to evaluate the impact of surface hardness on wear resistance. The experiment was conducted with a Saban-type wear tester of the construction shown in FIG. 10. As shown, the tester uses a loading weight 9 and a balancing weight 10 to urge a fixed specimen 11 against the outer circumference of a rotary specimen 12 and measures the total wear of the two specimens as it occurs during the rotation of the specimen 12. The two specimens 11 and 12 were made of the same material. The fixed specimen 11 was urged against the rotary specimen 12 at an initial contact pressure of 100 MPa and the rotary specimen 12 was rotated at a peripheral speed of 1 m/s, which was equivalent to the speed of friction between the two specimens 11 and 12. The two specimens were prepared from the same alloys as those used in the rolling fatigue life test and they were $B_2$, $B_3$, $B_6$r $A_7$, $A_5$ and $A_2$ in the increasing order of surface hardness. As is evident from FIG. 9, the wear resistance increases with surface hardness and satisfactory wear resistance is ensured if the surface hardness is HRC 57 or more.

Next, there is described an experiment conducted to investigate how the amount of retained austenite would affect the age-dependent change in the surface precision of raceways. The alloy identified as $B_6$ in Table 2 was used as a sample containing 8 vol% retained austenite (YR); $A_1$ was used as an alloy containing 6 vol% retained austenite; $A_6$ was used as an alloy containing 2 vol% retained austenite; and $A_4$ was used as an alloy containing no retained austenite.

Figure 11:
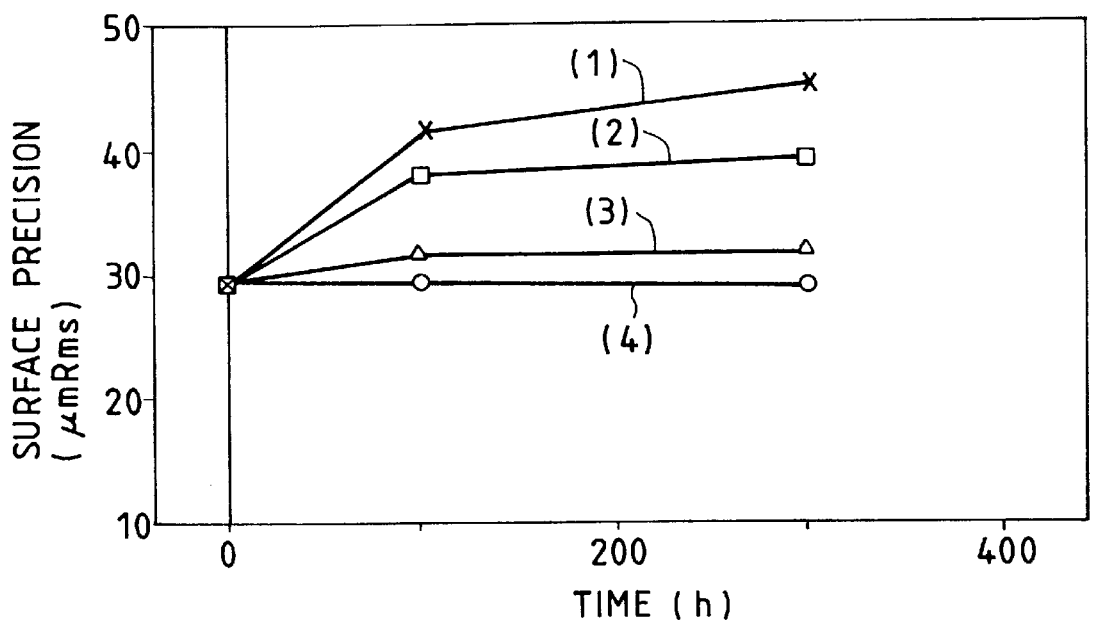
FIG. 11 is a graph showing an impact of retained austenite on the age-dependent deterioration of surface precision as determined in the fifth experiment.

Races were constructed from these four alloys and assembled into a spindle motor of the type shown in FIG. 1. After operating the spindle motor for specified periods of time (100 h and 300 h), the surface precision of each raceway was measured. The results are shown by four curves in FIG. 11; curves (1)–(4) represent the changes in surface precision when $\gamma_R$ was 8 vol%, 6 vol%, 2 vol% and 0%, respectively. As is evident from FIG. 11, the degree of deterioration in surface precision decreased with decreasing $\gamma_R$ and there was little deterioration when $\gamma_R$ waszero percent.

As the spindle motor was run continuously, the anderon value changed and the resulting change was measured after the passage of specified periods of time (100 h and 300 h).

Figure 12A:
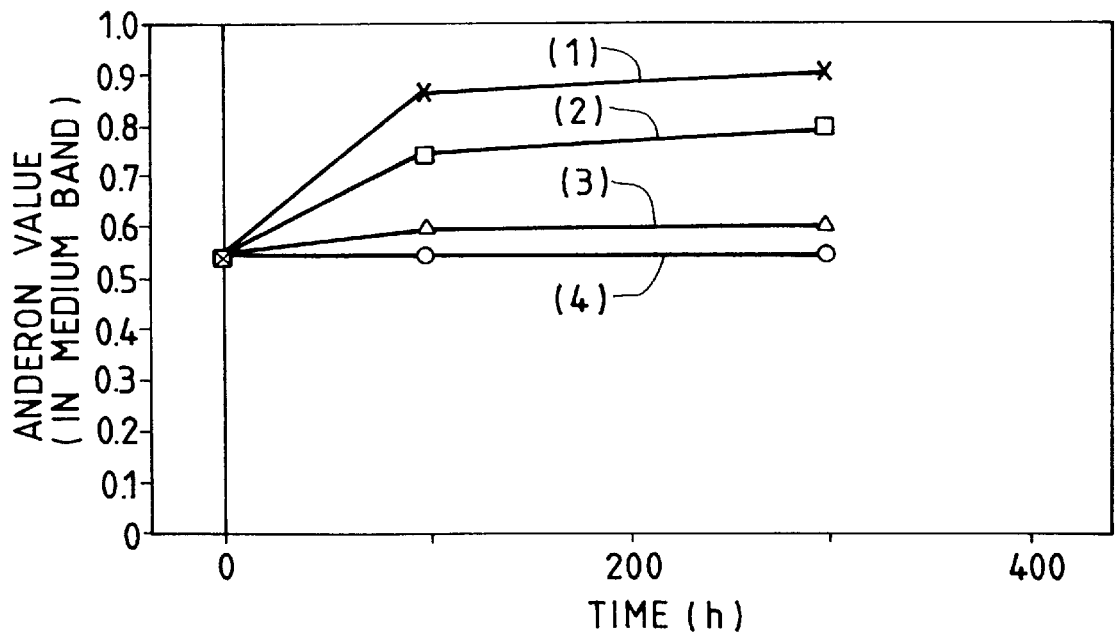
FIGS. 12A and 12B each shows graphically an impact of retained austenite on the age-dependent deterioration of acoustic characteristics as determined in the sixth experiment.
Figure 12B:
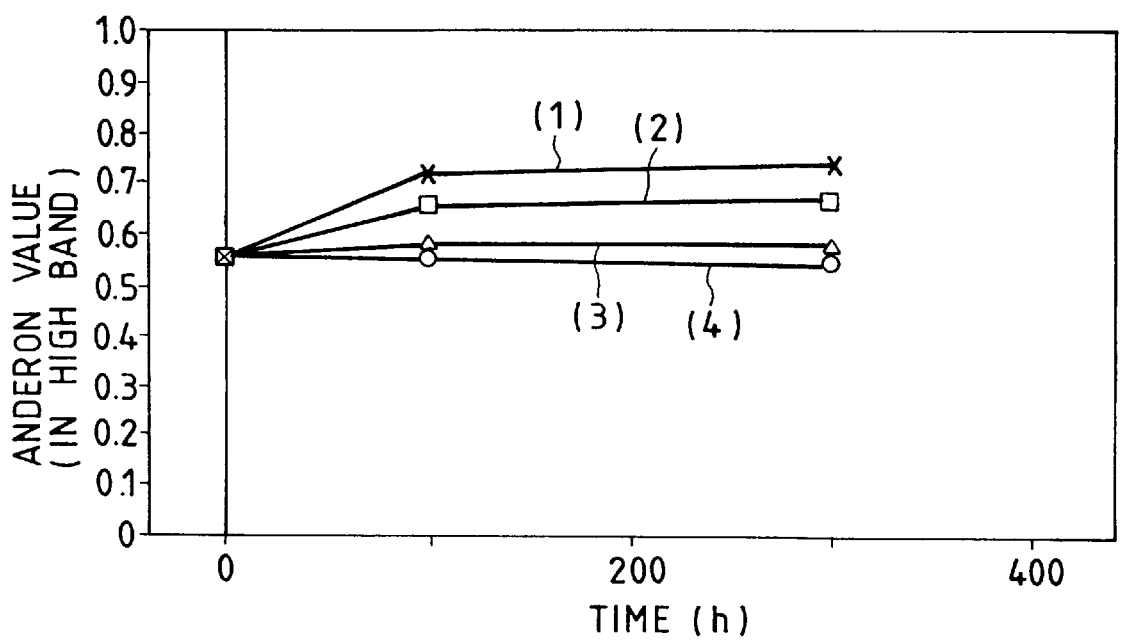

Of the anderon value data obtained, those in a medium band are shown by four curves in FIG. 12A and those in a high hand are similarly shown in FIG. 12B. The curves (1)–(4) in FIGS. 12A and 12B correspond to curves (1)–(4) in FIG. 11. As is evident from FIGS. 11, 12A and 12B, the degree of deterioration in surface precision decreased with decreasing $\gamma_R$ and, hence, the degree of deterioration (increase) in the anderon value which is an index of acoustic characteristics also decreased.

In the next place, experiments were conducted to verify the effectiveness of the present invention in the case of subjecting a hardened and tempered steel to shot peening (the second aspect of attaining the objective of the present invention), as well as in the case of subjecting a hardened steel to a subzero treatment, tempering and shot peening in that order (the third aspect). These experiments were basically the same as the experiments that were conducted to verify the effectiveness of the present invention in the case of using a secondary hardenable steel and they were conducted on 19 samples that were different in various aspects including the amount of retained austenite in the races (see Tables 3 and 4 below). The amount of retained austenite was adjusted by changing the conditions of the heat treatments to be applied to the races and by applying or not applying shot peening. Of the 19 samples shown in Tables 3 and 4, $A_{10}$–$A_{20}$ were within the scope of the present invention and $B_1$, $B_2$, $B_7$ and $B_{10}$–$B_{14}$ were comparisons in which at least one condition was outside the scope of the present invention. Symbols $A_{10}$–$A_{20}$ and $B_1$, $B_2$, $B_7$ and $B_{10}$–$B_{14}$ appearing in Table 3 correspond to symbols $A_{10}$–$A_{20}$ and $B_1$, $B_2$, $B_7$ and $B_{10}$–$B_{14}$, respectively, which appear in Table 4 (the same symbol represents the same sample). In addition, symbols $B_1$, $B_2$, $B_7$ and $B_{10}$ correspond to $B_1$, $B_2$, $B_7$ and $B_{10}$, respectively, which appeared in Tables 1 and 2. Symbols $A_{10}$, $A_{11}$, $A_{12}$ and $A_{13}$ represent samples that were prepared from raw materials having the same chemical compositions as $B_2$, $B_{10}$, $B_7$ and $B_1$ respectively, by performing the same heat treatments and subsequent shot peening. Take, for example, $A_{10}$ and $B_2$; they were identical to each other except for the application of shot peening and $A_{10}$ was subjected to shot peening but $B_2$ was not. This is also the case for the other pairs: $A_{11}/B_{10}$, $A_{12}/B_7$ and $A_{13}/B_1$.

TABLE 3

| | Chemical composition (wt %) | | | | | | | | |
|---|---|---|---|---|---|---|---|---|---|
| | C | Si | Mn | P | S | Cr | Mo | V | W |
| Invention | | | | | | | | | |
| $A_{10}$ | 1.05 | 0.42 | 0.35 | 0.018 | 0.011 | 17.2 | 0.45 | | |
| $A_{11}$ | 0.70 | 0.50 | 0.76 | 0.015 | 0.013 | 12.3 | 0.3 | | |
| $A_{12}$ | 0.70 | 0.50 | 0.76 | 0.015 | 0.013 | 12.3 | 0.3 | | |
| $A_{13}$ | 1.05 | 0.42 | 0.35 | 0.018 | 0.011 | 17.2 | 0.45 | | |
| $A_{14}$ | 1.05 | 0.42 | 0.35 | 0.018 | 0.011 | 17.2 | 0.45 | | |
| $A_{15}$ | 1.05 | 0.42 | 0.35 | 0.018 | 0.011 | 17.2 | 0.45 | | |
| $A_{16}$ | 1.05 | 0.42 | 0.35 | 0.018 | 0.011 | 17.2 | 0.45 | | |
| $A_{17}$ | 0.50 | 0.12 | 0.32 | 0.007 | 0.009 | 5.0 | 1.4 | 0.3 | 1.3 |
| $A_{18}$ | 0.70 | 0.50 | 0.76 | 0.015 | 0.013 | 12.3 | 0.3 | | |
| $A_{19}$ | 0.50 | 0.42 | 0.35 | 0.018 | 0.011 | 17.2 | 0.45 | | |
| $A_{20}$ | 0.85 | 0.85 | 0.38 | 0.013 | 0.010 | 9.0 | 1.5 | | |
| Comparison | | | | | | | | | |
| $B_1$ | 1.05 | 0.42 | 0.35 | 0.018 | 0.011 | 17.2 | 0.45 | | |
| $B_2$ | 1.05 | 0.42 | 0.35 | 0.018 | 0.011 | 17.2 | 0.45 | | |
| $B_7$ | 0.70 | 0.50 | 0.76 | 0.015 | 0.013 | 12.3 | 0.3 | | |
| $B_{10}$ | 0.70 | 0.50 | 0.76 | 0.015 | 0.013 | 12.3 | 0.3 | | |
| $B_{11}$ | 1.05 | 0.42 | 0.35 | 0.018 | 0.011 | 17.2 | 0.45 | | |
| $B_{12}$ | 1.05 | 0.42 | 0.35 | 0.018 | 0.011 | 17.2 | 0.45 | | |
| $B_{13}$ | 0.61 | 0.42 | 0.35 | 0.018 | 0.011 | 4.2 | 0.45 | | |
| $B_{14}$ | 0.35 | 0.42 | 0.35 | 0.018 | 0.011 | 13.1 | 0.45 | | |

TABLE 4

| | Heat treatment | | Surface hardness, $H_RC$ | Depth of hardened layer, mm | Primary carbides | Corrosion resistance | Retained austenite in surface layer, vol % | Shot peening | Impact resistance |
|---|---|---|---|---|---|---|---|---|---|
| | Hardening temperature, °C. | Tempering temperature, °C. | | | | | | | |
| Invention | | | | | | | | | |
| $A_{10}$ | 1050 | *540 | 59 | 0.30 | present | ⊙ | 0 (0) | yes (60) | ⊙ |
| $A_{11}$ | 1050 | *530 | 57 | 0.30 | absent | ⊙ | 0 (0) | " | ⊙ |
| $A_{12}$ | 1050 | *520 | 60 | 0.30 | " | ⊙ | 0 (3) | " | ⊙ |
| $A_{13}$ | 1050 | *500 | 62 | 0.30 | present | ⊙ | 4 (9) | " | Δ |
| $A_{14}$ | 1050 | *160 | 66 | 0.35 | " | ⊙ | 0 (9) | yes (100) | ⊙ |
| $A_{15}$ | 1050 | 160 | 62 | 0.30 | " | ⊙ | 6 (12) | yes (60) | Δ |
| $A_{16}$ | 1050 | 160 | 68 | 0.35 | " | ⊙ | 2 (12) | yes (100) | ⊙ |
| $A_{17}$ | 1050 | *160 | 61 | 0.35 | absent | ○ | 0 (7) | yes (100) | ⊙ |
| $A_{18}$ | 1050 | *160 | 61 | 0.35 | " | ⊙ | 0 (8) | yes (100) | ⊙ |
| $A_{19}$ | 1050 | *160 | 58 | 0.30 | " | ⊙ | 2 (8) | yes (60) | ⊙ |
| $A_{20}$ | 1050 | *160 | 63 | 0.35 | " | ⊙ | 0 (12) | yes (100) | ⊙ |
| Comparison | | | | | | | | | |
| $B_1$ | 1050 | *500 | 58 | | present | ⊙ | 9 (9) | no | x |
| $B_2$ | 1050 | *540 | 54 | | " | ⊙ | 0 (0) | no | ⊙ |
| $B_7$ | 1050 | *520 | 55 | | absent | ⊙ | 3 (3) | no | ○ |
| $B_{10}$ | 1050 | *530 | 52.5 | | " | ⊙ | 0 (0) | no | ⊙ |
| $B_{11}$ | 1050 | *160 | 60 | | present | ⊙ | 9 (9) | no | x |
| $B_{12}$ | 1050 | *540 | 54 | | " | ⊙ | 0 (0) | no | ⊙ |
| $B_{13}$ | 1050 | *160 | 61 | 0.35 | absent | x | 0 (7) | yes (100) | ⊙ |
| $B_{14}$ | 1050 | *160 | 56 | 0.35 | " | ○ | 0 (6) | yes (100) | ⊙ |

Figure 3:
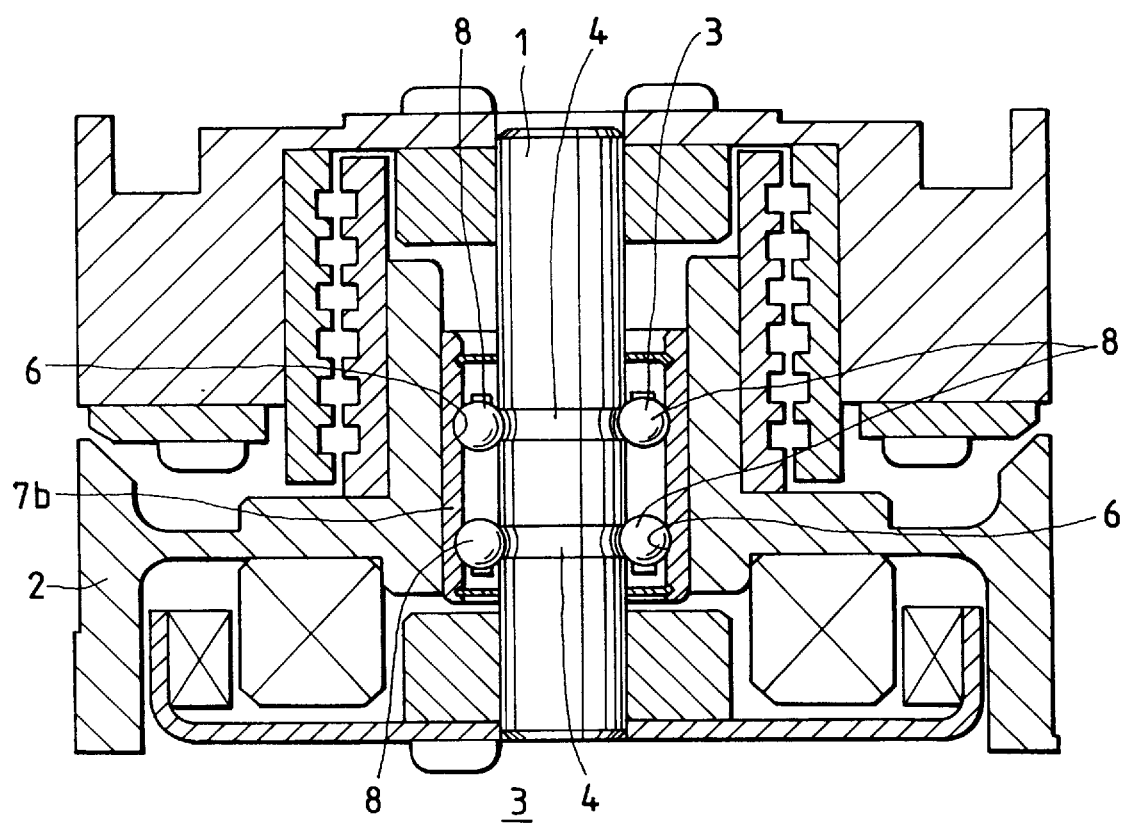
FIG. 3 is a sectional view showing yet a third example of the spindle motor on a HDD into which the ball bearing of the present invention had been assembled.

Table 3 lists the compositions of the alloys composing the 19 samples (except for Fe and incidental impurities). Table 4 lists the amount of retained austenite in the surface layer (the data for the core are within parentheses), the heat treatments applied to the 19 samples, the presence or absence of shot peening (the numerals within parentheses represent the impelling speed in m/s), the resulting hardness values (surface hardness values expressed in Rockwell hardness on C scale, $H_RC$), and the results of various experiments conducted on the samples. Of the 19 samples shown in FIGS. 3 and 4, $A_{10}$–$A_{14}$ and $A_{17}$–$A_{20}$ were within the scope of the present invention in the case of employing the third aspect of attaining its objective; $A_{15}$ and $A_{16}$ were within the scope of the present invention in the case of employing the second aspect; $B_1$, $B_2$, $B_7$ and $B_{10}$–$B_{14}$ were comparisons which were outside the scope of the present invention in whichever of the cases of employing the first, second and third aspects. The numerals in the column of "tempering temperature" in Table 4 that are preceded by a single asterisk indicate the application of a subzero treatment as part of the third aspect. All samples were subjected to a single tempering.

Thus, to attain the desired surface hardness and the desired amount of retained austenite in the surface layer, $A_{10}$–$A_{14}$ and $A_{17}$–$A_{20}$ were subjected to tempering, subzero treatment and shot peening, whereas $A_{15}$ and $A_{16}$ did not receive a subzero treatment but were subjected to tempering and shot peening. In the shot peening, steel balls having an average size of 0.52 mm and an average hardness of $H_RC$ 61 were impelled against the samples at an average speed of 60 m/s for $A_{10}$–$A_{13}$, $A_{15}$ and $A_{19}$, and at 100 m/s for $A_{14}$, $A_{16}$–$A_{18}$, $A_{20}$, $B_{13}$ and $B_{14}$. The coverage was 500% irrespective of the impelling speed.

In the second and third aspects of attaining the objective of the present invention, shot peening is performed for the following reasons. When steel samples containing C and Cr for use in those two aspects have been tempered, they do not satisfy simultaneously the two requirements, one for achieving a surface hardness of at least HRC 57 and the other for containing retained austenite in an amount of no more than 6 vol%. Therefore, the tempering is followed by shot peening so that the mechanical energy it affords is used not only to transform the austenitic structure to a martensite phase but also to achieve a higher surface hardness. As a result, the surface hardness of the treated steel is increased to $H_RC$ 57 or more. At the same time, the amount of retained austenite in at least the surface layer is reduced to 6 vol% or less. In other samples, not only shot peening but also a subzero treatment were conducted and this was also for the purpose of achieving the austenite to martensite transformation more effectively in order to ensure that the amount of retained austenite in the surface layer would be reduced to 6 volt and less. Thus, as in the aforementioned example of the present invention for the use of a secondary hardenable steel, not only the amount of retained austenite decreased but also the surface hardness improved in the example involving the step of shot peening, as well as in the example involving the combination of shot peening and subzero treatment. Shot peening was effective in improving the surface hardness up to about $H_RC$ 68 when tempering was performed at low temperatures between 150° and 200° C.

Figure 13:
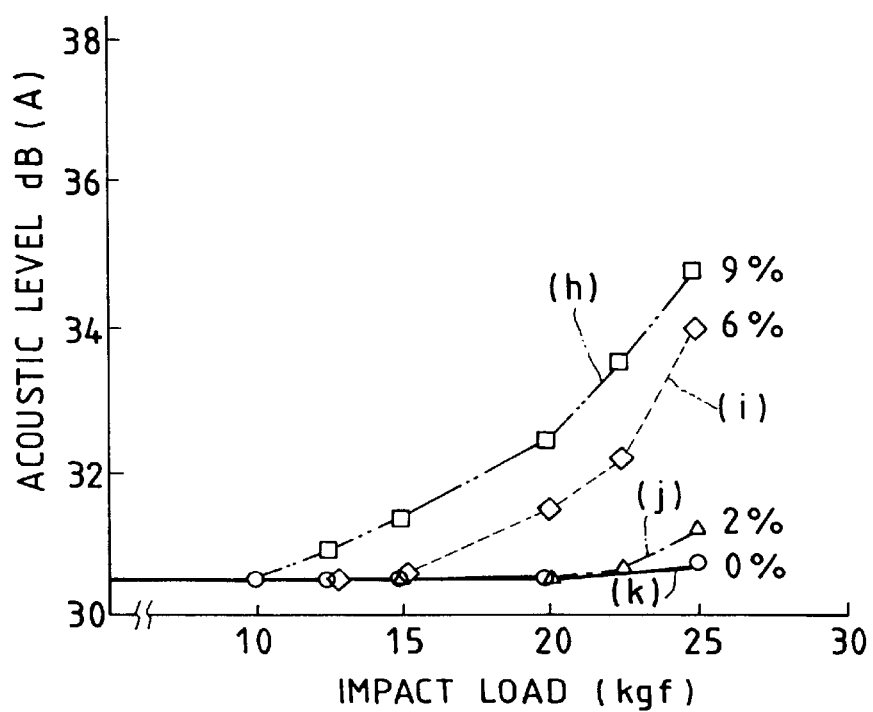
FIG. 13 is a graph showing an impact of retained austenite on the level of deterioration in acoustic level under impact loads, as determined in the first of the experiments conducted to verify the effectiveness of the present invention for the case of applying shot peening.

Five experiments were conducted in order to verify the effectiveness of the present invention in the case of performing shot peening. FIG. 13 shows the result of an experiment conducted to evaluate the impact of the amount of retained austenite on acoustic level. The experimental protocol was the sane as that of the experiment conducted to evaluate the impact of the amount of retained austenite on acoustic level, which was one of the experiments conducted to verify the effectiveness of the present invention in the case of using the aforementioned secondary hardenable steel. The vertical axis of the graph in FIG. 13 plots the acoustic level that occurred after the application of impact loads and the horizontal axis plots the magnitude of the applied impact loads. One-long-and-two-short dashed line (h) in FIG. 13 refers to samples containing 9 vol% of retained austenite in the surface layer which were identified as $B_1$ and $B_{11}$ in Tables 3 and 4; dashed line (i) refers to sample $A_{15}$ containing 6 volt of retained austenite in the surface layer; one-long-and-one-short dashed line (j) refers to samples $A_{16}$ and $A_{19}$ which contained 2 volt of retained austenite in the surface layer; and solid line (k) refers to samples $A_{10}$–$A_{12}$, $A_{14}$, $A_{17}$, $A_{18}$, $A_{20}$, $B_2$, $B_{10}$ and $B_{12}$–$B_{14}$ which contained no retained austenite in the surface layer.

As is evident from FIG. 13, when the amount of retained austenite in the surface layer was about 6 vol%, the increase in acoustic level was small even under application of great impact loads. When the amount of retained austenite in the surface layer was 2 volt and less, not only was small the increase that occurred in the acoustic level but also the magnitude of impact loads at which the acoustic level started to increase was reasonably great. These data show that the impact resistance of raceways could be improved by insuring that the amount of retained austenite in at least the surface layer of races would be reduced to sufficiently low levels. When the amount of retained austenite in the surface layer was further reduced until it became zero percent, the increase in acoustic level was negligible under application of impact loads. The impact resistance of the samples under test is rated in Table 4 by four criteria x, Δ, o and ⊙, which have the same meanings as defined for Table 2.

Figure 14:
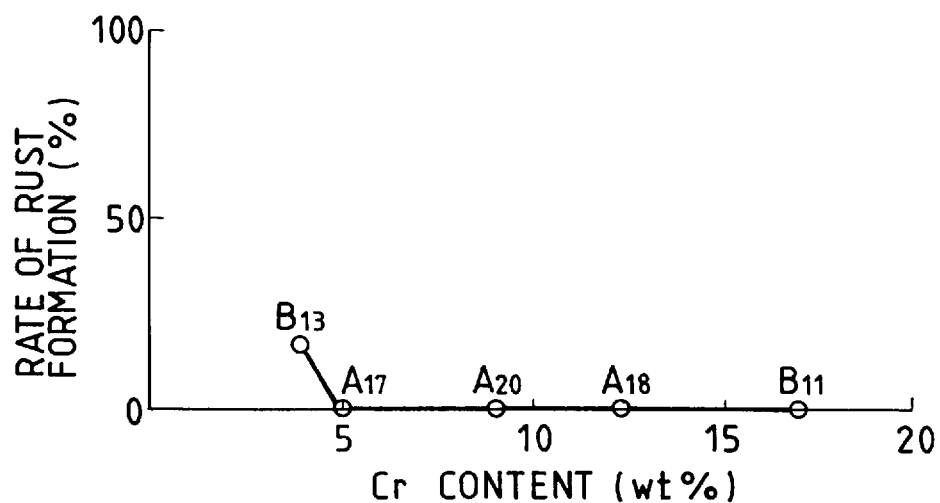
FIG. 14 is a graph showing an impact of Cr content on the corrosion resistance as determined by a temperature-humidity combination test in the second experiment.
Figure 15:
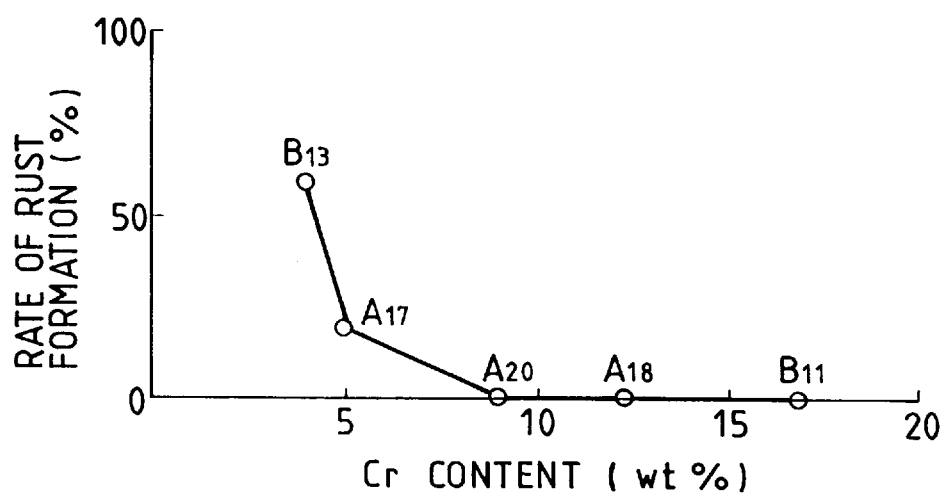
FIG. 15 is a graph showing an impact of Cr content on the corrosion resistance as determined by a wet box test in the second experiment.

FIGS. 14 and 15 show the results of an experiment conducted to evaluate the impact of Cr content on corrosion resistance. Five alloys having different Cr contents were selected from among the alloys listed in Table 3 and used in the experiment. The selected alloys were $B_{13}$, $A_{17}$, $A_{20}$, $A_{18}$ and $B_{11}$, in the increasing order of Cr content. Ten specimens were prepared for each of the 5 alloys and a total of 50 specimens were subjected to corrosion tests after the heat treatments shown in Table 4, finish polishing and surface degreasing. Each specimen was a disk having a diameter 13 mm and a thickness of 5 mm. These experimental conditions were the same as those for the experiment conducted to evaluate the impact of Cr content on corrosion resistance, which was the second of the experiments conducted to verify the effectiveness of the present invention in the case of using the aforementioned secondary hardenable steel.

The corrosion tests were of the following two types which were already described above in connection with the present invention for the case of using the secondary hardenable steel.

(1) Temperature-humidity combination (cycle) test as the environmental test (electric and electronic) specified under JIS C0028

After 10 temperature-humidity cycles according to this test, the surfaces of the respective specimens were examined visually and the percentage of surface rusting was determined. The result is plotted on the vertical axis of the graph in FIG. 14.

(2) Wet box test specified under JIS K2246

After this test was conducted for 1000 h, the surfaces of the respective specimens were examined visually and the percentage of surface rusting was determined. The result is plotted on the vertical axis of the graph in FIG. 15.

As is evident from FIGS. 14 and 15, under environmental conditions as employed in the temperature-humidity combination test, corrosion was prone to occur when the Cr content became less than 5 wt%. Under severe conditions as employed in the wet box test, corrosion was prone to occur when the Cr content became less than 7 wt%. Under more severe conditions, corrosion was prone to occur when the Cr content became less than 9 wt%. Thus, as is evident from the results of the experiment, under normal conditions, the surface rusting of races could be prevented by increasing the Cr content to 5 wt% or more even when the races were constructed by a process involving shot peening or subzero treatment. It was also clear from the experiment that even under severely corrosive conditions, the same effect could be achieved by increasing the Cr content to 7 wt% or more. The results of the corrosion tests are rated in Table 4 by four criteria x, a, o and ⊚, which have the same meanings as defined for Table 2.

Figure 16:
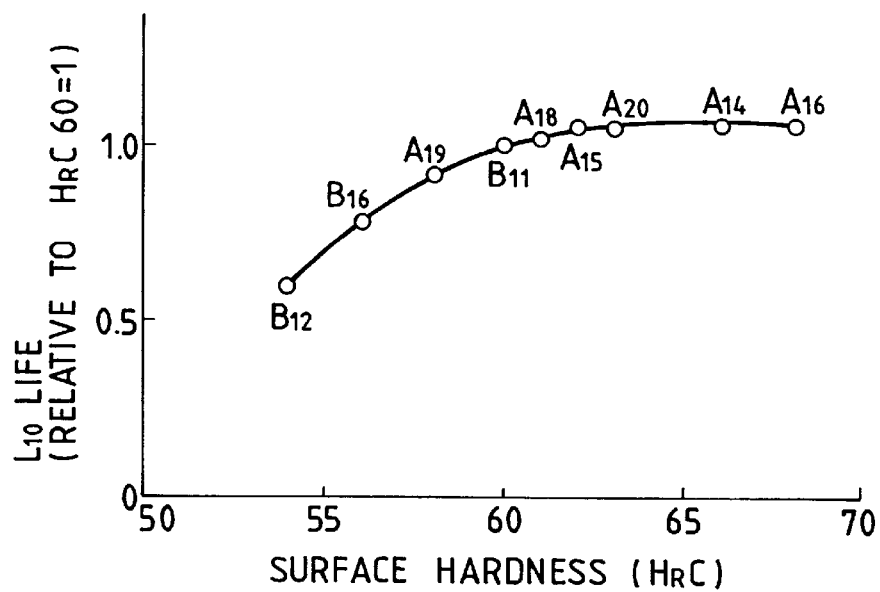
FIG. 16 is a graph showing an impact of surface hardness on rolling fatigue life as determined in the third experiment.

FIG. 16 shows the result of an experiment conducted to evaluate the impact of surface hardness on rolling fatigue life. The experimental protocol was identical to that of the experiment conducted to evaluate the impact of surface hardness on rolling fatigue life, which was the third of the experiments conducted to verify the effectiveness of the present invention in the case of using the aforementioned secondary hardenable steel. Among the alloys listed in Tables 3 and 4, samples $B_{11}$, $B_{12}$, $B_{14}$, $A_{14}$–$A_{16}$ and $A_{18}$–$A_{20}$ were used to construct thrust races as specimens, which were assembled into a thrust ball bearing after the heat treatments shown in Table 4. The bearings were set on the already described life tester and given a contact pressure of 4900 MPa to measure the rolling life of each of the 9 specimens.

The result of this rolling fatigue life test is shown in FIG. 16. The vertical axis of the graph in FIG. 16 plots the relative life with respect to the reference specimen having a surface hardness of $H_RC$ 60 (plotting a ratio of the life of each specimen when serving the life of the reference specimen as unity). As is evident from FIG. 16, the rolling fatigue life is largely dependent on surface hardness. Accordingly, as the surface hardness increases beyond $H_RC$ 55 to approach 60, the rolling fatigue life-is extended significantly.

Figure 17:
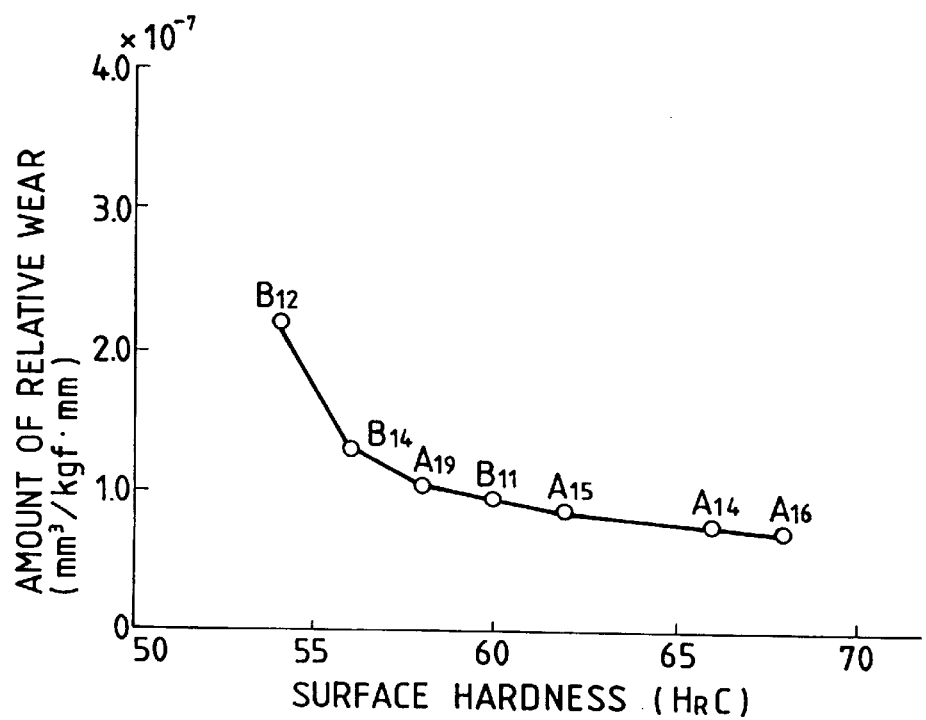
FIG. 17 is a graph showing an impact of surface hardness on wear resistance as determined in the fourth experiment.

FIG. 17 shows the result of an experiment conducted to evaluate the impact of surface hardness on wear resistance. The experiment was also conducted with a Saban-type wear tester of the construction shown in FIG. 10. The experimental conditions were the same as those of the experiment conducted to evaluate the impact of surface hardness on wear resistance, which was the fourth of the experiments conducted to verify the effectiveness of the present invention for the case of using the aforementioned secondary hardenable steel. Specimens 11 and 12 (see FIG. 10) were prepared from seven alloys ($B_{11}$, $B_{12}$, $B_{14}$, $A_{14}$–$A_{16}$ and $A_{19}$) as selected from among those listed in Tables 3 and 4. As is evident from FIG. 17, the wear resistance increases with surface hardness and satisfactory wear resistance is ensured if the surface hardness is HRC 57 or more.

Figure 18A:
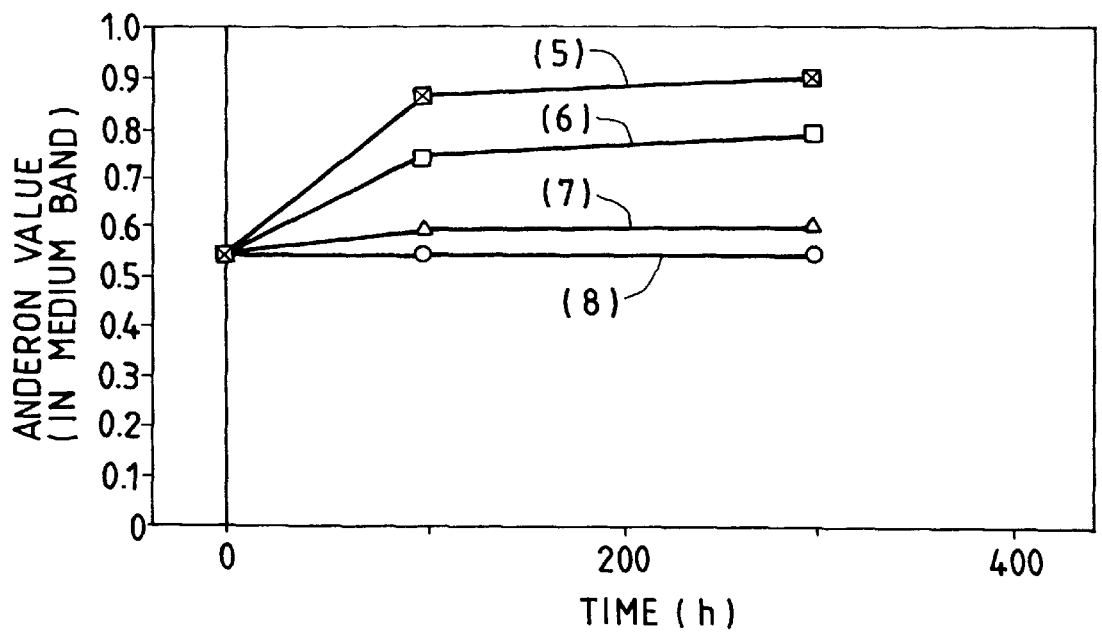
Figs. 18A and 18B each shows graphically an impact of retained austenite on the age-dependent deterioration of acoustic characteristics as determined in the fifth experiment.
Figure 18B:
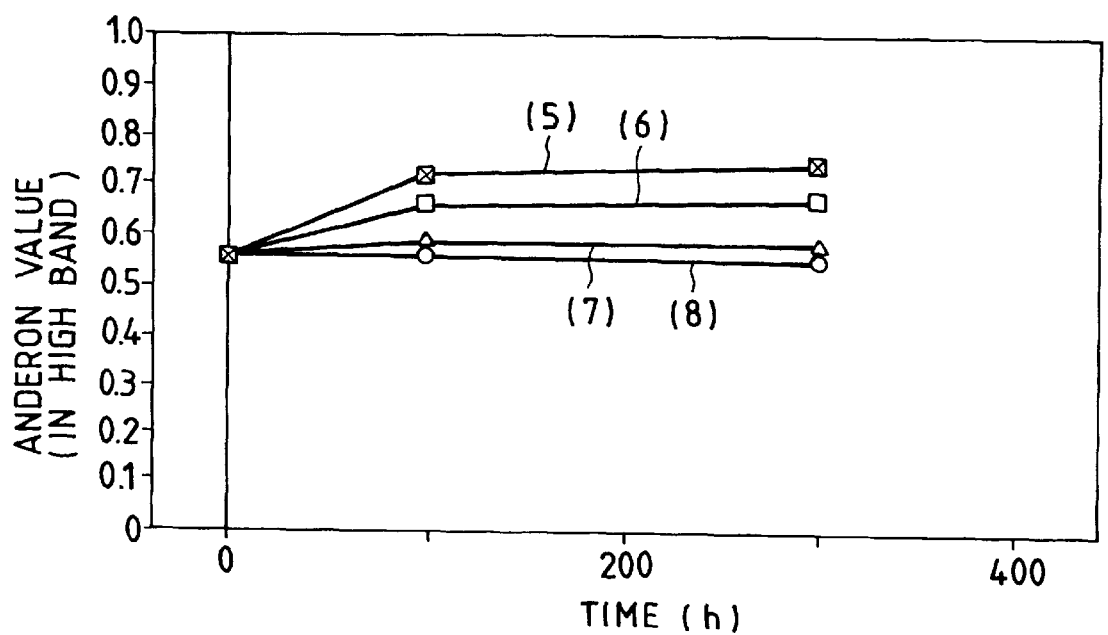

Next, there is described an experiment conducted to investigate how the amount of retained austenite would affect the deterioration of acoustic characteristics. The experimental protocol was the same as that of the experiment conducted to evaluate the impact of retained austenite on the deterioration of acoustic characteristics, which was the fifth of the experiments conducted to verify the effectiveness of the present invention for the case of using the aforementioned secondary hardenable steel. Stated more specifically, 17 out of the 19 samples listed in Tables 3 and 4 ($A_{10}$–$A_{20}$, $B_1$, $B_2$, $B_7$ and $B_{10}$–$B_{14}$) were selected and they were $B_1$ and $B_{11}$, ($\gamma_R$ in the surface layer was 9 volt), $A_{13}$ (6 vol%), $A_{16}$ and $A_{19}$ (2 volt), and $A_{10}$–$A_{12}$, $A_{14}$, $A_{17}$, $A_{18}$, $A_{20}$, $B_2$, $B_{10}$ and $B_{12}$–$B_{14}$ (0%); races were constructed from these samples and assembled into a spindle motor of the type shown in FIG. 1. AB the spindle motor was run continuously, the anderon value changed and the resulting change was measured after the passage of specified periods of time (100 h and 300 h). Of the anderon value data obtained, those in a medium band are shown by four curves in FIG. 18A and those in a high band are similarly shown in FIG. 1BB. The curves (5)–(8) represent the degree of deterioration in acoustic characteristics when $\gamma_R$ in the surface layer was 9 volt, 6 vol%, 2 vol% and 0%, respectively. As is evident from FIGS. 18A and 19B, the degree of deterioration (increase) in the anderon value which is an index of acoustic characteristics decreased with decreasing $\gamma_R$. Accordingly, the value of $\gamma_R$ becomes smaller as the degree of deterioration becomes smaller in surface precision which affects the anderon value. In addition, shot peening is effective in reducing the degree of deterioration in surface precision and it hence contributes to a smaller degree of deterioration in the anderon value.

The results of the experiments described above demonstrate that the samples of rolling bearing satisfying the requirements of the present invention can achieve satisfactory impact resistance. However, comparisons $B_1$–$B_{14}$ outside the scope of the present invention are not satisfactory in terms of rolling life and wear resistance and their performance is low because the amount of retained austenite in the surface layer is greater than 6 vol% (as in $B_1$ and $B_{11}$) or the surface hardness is $H_RC$ 55 and below (as in $B_2$, $B_7$, $B_{10}$ and $B_{12}$) Comparisons $B_9$ and $B_{13}$ are outside the scope of the present invention in terms of the Cr content but they are within the scope of the present invention in terms of surface hardness and the amount of retained austenite in the surface layer. Hence, $B_9$ and $B_{19}$ would have comparable performance to the samples of the invention but, in fact, due to low Cr content (1.4 wt% in $B_9$ and 4.2 wt% in $B_{13}$), they are prone to rusting and hence is not suitable for use under severe (corrosive) conditions. In addition, comparison $B_{14}$ which is outside the scope of the present invention in terms of C content has unduly low surface hardness ($H_RC$ 56); therefore, it is not satisfactory in terms of rolling life and wear resistance and its performance as a bearing is low.

Figure 19:
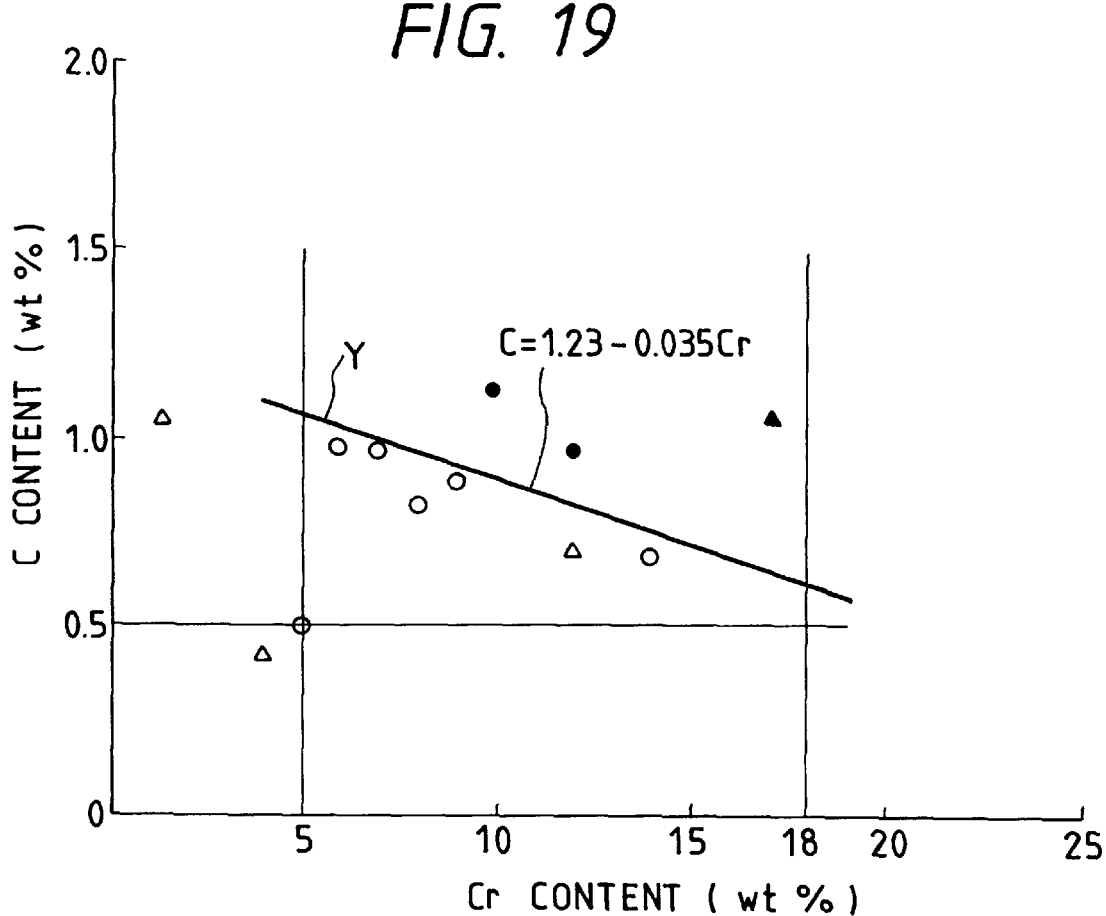
FIG. 19 is a graph showing an impact of the C and Cr contents on the generation of primary carbides.
Figure 20:
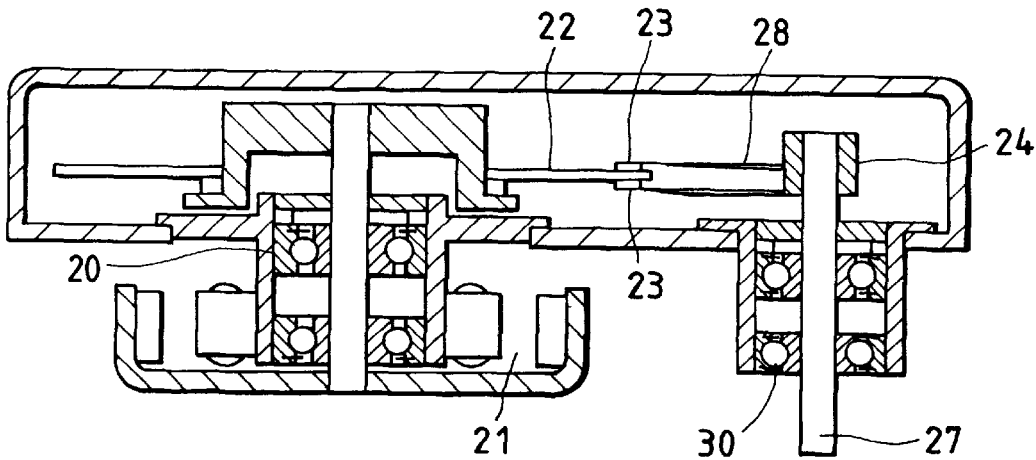
FIG. 20 is a sectional view showing an example of the HDD into which each example of the spindle motors shown in FIGS. 1–3 is assembled with swing arms.

Finally, there is described the impacts of the C and Cr contents on the generation of primary carbides by reference to FIG. 19. To measure primary carbides, a longitudinal section was taken through the center of a steel sample having an outside diameter of 13 mm and arbitrary selected positions 1.6 mm from the center were examined over a total area of 3.5 $MM^2$ to check for the presence of primary carbides having a grain length of 10 µm and more. The graph in FIG. 19 plots the C and Cr contents of several alloy species on the vertical and horizontal axes, respectively The triangles in FIG. 19 represent alloys outside the scope of the present invention whereas circles represent alloys within the scope of the present invention. The expression "within the scope of the present invention" indicates that not only the conditions on the C and Cr contents but also the other conditions of the present invention are satisfied. Therefore, alloys that have C and Cr contents within the claimed ranges but which do not satisfy the other conditions are "outside the scope of the present invention". The open circles represent alloys that did not generate primary carbides having a grain length of 10 µm and more, and the solid circles represent alloys that generated such primary carbides. As is evident from FIG. 19, the C and Cr contents affect the generation of primary carbides and that primary carbides having a grain length of 10 μm and more are not generated by selecting C and Cr contents below the straight line Y (C=1.23–0.035 Cr) in FIG. 19. Among the samples listed in Tables 1 and 2, $A_{1-A6}$ and $A_8$ fall within the area under the line Y and do not generate primary macro carbides; this is also the case for $A_{11}$, $A_{12}$ and $A_{17}$–$A_{20}$ (see Tables 3 and. 4), and all of these samples are therefore preferred.

Moreover, by performing shot peening serving as a surface layer hardening treatment employed in the present invention, not only an improvement in hardness but also an effective adjustment in the amount of retained austenite can accomplished for areas that extend from the surface down to a depth of about 0.2 mm. Therefore, the second and third aspects for hardening the surface layer can be applied to rolling bearings that use rolling elements in which 2% of the diameter is 0.2 nm (rolling elements the diameter of which can be up to about 10 mm). As for the first aspect of attain the objective of the present invention, the amount of retained austenite can be reduced throughout the body of rolling elements ranging from the surface to the core portion and, hence, there is no need to consider the aforementioned limitation on the diameter of rolling elements. In addition, hardening the surface layer is in no way limited to shot peening and various other techniques f or decomposing the retained austenite in the surface layer can be adopted, as exemplified by tumbling and barrel finishing processes.

While the foregoing explanation of the various examples of the present invention is directed to ball bearings which use balls as rolling elements, it should be understood that the concept of the present invention is also applicable to roller bearings which use various types of rollers as rolling elements, and which support the spindle motor and the swing arm in the HDD or the like.

Having the structural and operational features described herein, the ball bearing of the present invention assures satisfactory corrosion resistance and can yet exhibit better impression resistance, longer rolling fatigue life and higher wear resistance. When assembled into ADD, VTR, and other equipment, the ball bearing can improve the acoustic and endurance characteristics of these equipment, thereby contributing to an improvement in their overall performance.

What is claimed is:

1. A rolling bearing comprising:
an inner member having an inner raceway on an outer circumference, an outer race having an outer raceway on an inner circumference, and a plurality of rolling elements interposed rollingly between the inner raceway and the outer raceway, said inner member being an inner race or a shaft;
wherein at least one component of the inner member, the outer race, and the rolling elements is formed of steel comprising 5–18 wt% of Cr, 0.68–1.2 wt% of C and the balance being Fe, said at least one component having a surface hardness of $H_RC$ 57 or more and a surface layer subjected to hardening and tempering including an amount of retained austenite of no more than 6 vol%.

2. A rolling bearing comprising:
an inner member having an inner raceway on an outer circumference, an outer race having an outer raceway on an inner circumference, and a plurality of rolling elements interposed rollingly between the inner raceway and the outer raceway, said inner member being an inner race or a shaft;
wherein at least one component of the inner member, the outer race, and the rolling elements is formed of steel comprising 5–17.2 wt% of Cr, 0.63–1.2 wt% of C, and the balance being Fe, said at least one component having a surface hardness of $H_RC$ 57 or more and a surface layer including an amount of retained austenite of no more than 6 vol%; and wherein the steel has a relationship of $$C \leq 1.23 - 0.035 \times Cr$$

between C and Cr contents in the steel.

3. The rolling bearing of claim 1, wherein the surface layer includes an amount of retained austenite of no more than 2 vol%.

4. A rolling bearing comprising:
an inner member having an inner raceway on an outer circumference, an outer race having an outer raceway on an inner circumference, and a plurality of rolling elements interposed rollingly between the inner raceway and the outer raceway, said inner member being an inner race or a shaft;
wherein at least one component of the inner member, the outer race, and the rolling elements is formed of steel comprising 5–17.2 wt% of Cr, 0.63–1.2 wt% of C, and the balance being Fe, said at least one component having a surface hardness of $H_RC$ 57 or more and a surface layer including an amount of retained austenite of no more than 6 vol%.

5. The rolling bearing of claim 1, wherein the steel is subjected to hardening and tempering, and is then subjected to shot peening to provide a surface hardness of $H_RC$ 57 or more.

6. The rolling bearing of claim 1, wherein the steel is subjected to hardening and a subzero treatment, followed by tempering and shot peening to provide a surface hardness of $H_RC$ 57 or more.

7. The rolling bearing of claim 1, wherein the steel has a relationship of $$C \leq 1.23 - 0.035 \times Cr$$

between C and Cr contents in the steel.

8. The rolling bearing of claim 7, wherein the surface layer includes an amount of retained austenite of no more than 2 vol%.

9. The rolling bearing of claim 7, wherein the steel is subjected to hardening and tempering, and is then subjected to shot peening to provide a surface hardness of $H_RC$ 57 or more.

10. The rolling bearing of claim 7, wherein the steel is subjected to hardening and a subzero treatment, followed by tempering and shot peening to provide a surface hardness of $H_RC$ 57 or more.

11. A rolling bearing comprising:
an inner member having an inner raceway on an outer circumference, an outer race having an outer raceway on an inner circumference, and a plurality of rolling elements interposed rollingly between the inner raceway and the outer raceway, said inner member being an inner race or a shaft;
wherein at least one component of the inner member, the outer race, and the rolling elements is formed of steel comprising 5–18 wt% of Cr; 0.68–1.2 wt% of C; at least one additional element which is selected from the group consisting of: 0.8–6 wt% of Mo, 0.3—3 wt% of V, and 1–6 wt% of W; and the balance being Fe, said at least one component having a surface hardness of $H_RC$ 57 or more and a surface layer subjected to hardening and tempering including an amount of retained austenite of no more than 6 vol%.

12. A rolling bearing comprising:

an inner member having an inner raceway on an outer circumference, an outer race having an outer raceway on an inner circumference, and a plurality of rolling elements interposed rollinqly between the inner raceway and the outer raceway, said inner member being an inner race or a shaft;

wherein at least one component of the inner member, the outer race, and the rolling elements is formed of steel comprising 5–18 wt% of Cr; 0.68–1.2 wt% of C; at least one additional element which is selected from the group consisting of: 0.8–6 wt% of Mo, 0.3–3 wt% of V, and 1–6 wt% of W; and the balance being Fe, said at least one component having a surface hardness of $H_RC$ 57 or more and a surface layer subjected to hardening and tempering including an amount of retained austenite of no more than 6 vol%; and wherein said at least one component is subjected to high-temperature tempering at a secondary hardening temperature.

* * * * *